(12) United States Patent
Scott et al.

(10) Patent No.: US 7,305,281 B2
(45) Date of Patent: Dec. 4, 2007

(54) METHODS AND SYSTEMS FOR THE MANAGEMENT OF A BULK ELECTRIC POWER MARKET

(75) Inventors: Donna M. Scott, Southampton, MA (US); Katherine Gilliland, Raleigh, NC (US); Patchin Curtis, Annapolis, MD (US); Cheryl Nason, Pakenham (CA); Heather Neale, Toronto (CA); Aaron Osguthorpe, Arlington, VA (US)

(73) Assignee: ISO New England Inc., Holyoke, MA (US)

( * ) Notice: Subject to any disclaimer, the term of this patent is extended or adjusted under 35 U.S.C. 154(b) by 109 days.

(21) Appl. No.: 11/123,541

(22) Filed: May 6, 2005

(65) Prior Publication Data

US 2005/0197742 A1 Sep. 8, 2005

Related U.S. Application Data

(63) Continuation-in-part of application No. 10/366,632, filed on Feb. 13, 2003, now Pat. No. 6,909,941.

(51) Int. Cl.
*G05D 11/00* (2006.01)
(52) U.S. Cl. ...................... 700/286; 705/412
(58) Field of Classification Search ............... 700/286; 705/37, 412
See application file for complete search history.

(56) References Cited

U.S. PATENT DOCUMENTS

| | | | |
|---|---|---|---|
| 4,804,938 A | 2/1989 | Rouse et al. | |
| 6,021,402 A | 2/2000 | Takriti | |
| 6,115,698 A | 9/2000 | Tuck et al. | |
| 6,529,839 B1* | 3/2003 | Uggerud et al. | 702/61 |
| 6,618,709 B1 | 9/2003 | Sneeringer | |
| 6,681,156 B1* | 1/2004 | Weiss | 700/291 |
| 6,868,293 B1 | 3/2005 | Schurr et al. | |
| 7,009,493 B2 | 3/2006 | Howard et al. | |
| 2002/0019758 A1 | 2/2002 | Scarpelli | |
| 2002/0019802 A1 | 2/2002 | Malme et al. | |
| 2003/0055664 A1 | 3/2003 | Suri | |
| 2003/0074244 A1* | 4/2003 | Braxton | 705/7 |
| 2004/0010478 A1 | 1/2004 | Peljto et al. | |
| 2004/0215348 A1* | 10/2004 | Ilic et al. | 700/1 |

* cited by examiner

*Primary Examiner*—Alexander Kosowski
(74) *Attorney, Agent, or Firm*—Lipsitz & McAllister, LLC

(57) ABSTRACT

The present invention provides methods and systems for managing a bulk electric power market. A set of inter-related automated process streams relating to the bulk electric power market are implemented. A plurality of automated processes for each process stream may also be implemented. At least one process of each process stream serves as an input to, or output from, at least one other process stream. Each process may comprise: (i) automated inputs; (ii) automated activities; (iii) and automated outputs. The process streams may be used to manage a bulk electric power market and to control an electric power grid. For example, the process streams may be used for determining market-based wholesale electric rates; scheduling transmission outages; creating a day-ahead market schedule; and calculating monetary positions of customers involved in settlement of the day-ahead market.

40 Claims, 21 Drawing Sheets

MARKET DEVELOPMENT AND ANALYSIS PROCESS STREAM 200

REAL-TIME MARKETS
PROCESS STREAM 400

INFORMATION TECHNOLOGY PROCESS STREAM 1200

METHODS AND SYSTEMS FOR THE MANAGEMENT OF A BULK ELECTRIC POWER MARKET

This application is a continuation-in-part of commonly assigned U.S. patent application Ser. No. 10/366,632 filed on Feb. 13, 2003 now U.S. Pat. No. 6,909,941.

BACKGROUND OF THE INVENTION

The present invention relates to the purchase and sale of electric power. More specifically, the present invention relates to methods and systems for the management of a bulk electric power market. In particular, the present invention provides methods and systems for use by an Independent System Operator (ISO), a Regional Transmission Organization, or other manager of a bulk electric power market to manage the bulk electric power market for a large region.

Previously, utility companies were vertically integrated. Vertically integrated utilities are those that operate independently of one another, are not connected and serve a native load. These are the companies that generated and delivered electricity to the consumer. Vertically integrated utilities typically provide the following services: generation (the production of electricity), transmission (the transport of electricity to substations), and distribution (the delivery of electricity to homes and businesses).

In November of 1965, the northeast region of the United States incurred a substantial blackout, now commonly referred to as the Great Northeast Blackout. A great portion of the Northeast region was left without power, which affected over 30-million people. Power was out in some areas for over 13 hours.

The Great Northeast Blackout was a turning point for the electricity industry, especially in New England. After the Great Northeast Blackout, the vertically integrated utility companies began discussions about connecting to one another to ensure a more reliable electric generation and delivery system. As a result, the "power pool" concept was developed in each of New England, New York and the Mid-Atlantic States. The New England Power Pool (NEPOOL) was officially organized in November of 1971.

With the organization of NEPOOL, a majority of New England investor-owned and municipal utilities formally joined together to increase reliability of electricity delivery by building a regional grid. By ending the era of the unconnected utility company, NEPOOL improved the reliability of electricity delivery and accrued savings that were passed on to the consumer. At that time New England's grid was composed of approximately 330 generating units connected by over 8,000 miles of high voltage transmission lines. No region-wide blackout has occurred on the bulk power grid since NEPOOL's inception.

In 1996, the Federal Energy Regulatory Commission (FERC) issued Orders 888 and 889 in response to the Energy Policy Act requirements and removed obstacles to competition in the wholesale trade of electricity, bringing more efficient, lower-cost electricity to customers across the country. FERC's main objective was to open the transmission systems to fair and non-discriminatory access, providing a fair transition to competitive bulk power markets while maintaining overall reliability of the system.

NEPOOL interpreted Orders 888 and 889 and proposed an independent system operator (ISO) for New England. The ISO concept was developed by the FERC as part of the framework to support the deregulation of the $200 billion electric industry in the United States. The ISO concept provides a neutral entity responsible for the management of the bulk electric power system, a transmission reservation system known as OASIS (Open Access Sametime Information System), and a wholesale electricity marketplace. The FERC envisioned the establishment of several regional ISO's across the country, all of which would be approved and regulated by FERC. FERC stated its principles for ISO operation and governance in Order 888. These principles include: providing independent, open and fair access to the region's transmission system; establishing a non-discriminatory governance structure; facilitating market-based wholesale electric rates; and ensuring the efficient management and reliable operation of the bulk power system.

The ISO concept has been implemented across the country, primarily in areas where deregulation has progressed significantly. ISO New England, established as a not-for-profit, non-stock corporation on Jul. 1, 1997, achieved regional transmission organization (RTO) status on Feb. 1, 2005. FERC introduced the concept of RTOs in its Order 2000 to further promote industry efficiencies and transmission development. As an RTO, ISO New England, as assignee of the present invention, has broader authority over the development of rules that govern the wholesale electricity market, but still maintains the same responsibilities it had as an ISO: day-to-day operation of the bulk power system in New England, administration of the Open Access Transmission tariff and management of a comprehensive regional bulk power planning process.

Introduced in March 2003, New England's current wholesale electricity marketplace uses a locational marginal pricing (LMP) methodology based on eight pricing zones, which are designed to accurately reflect the cost of wholesale electricity in all locations. In addition, the eight LMP zones have two market settlements, day-ahead and real-time. The eight energy pricing zones include one for each of the following states: Connecticut, Maine, New Hampshire, Rhode Island and Vermont, and three for Massachusetts. In 2006, a ninth energy zone will be introduced in Southwest Connecticut, based on system needs.

The New England Power Pool continues as ISO New England's advisory stakeholder group and is a voluntary consortium of electricity companies interested in doing business in New England. Due to state-level legislation to restructure the industry, many of the vertically integrated utilities across New England were required to divest generation assets. The current membership of NEPOOL includes not only vertically integrated and municipal utilities, but also generation companies, transmission and distribution companies, power marketers, end users, and load aggregators. Under the RTO, a sixth sector for alternative energy was added.

It would be advantageous to provide methods and systems for managing the bulk electric power market which are process oriented and integrate the various processes used in an efficient manner. Such a process oriented system would enable faster assimilation of data and quicker adaptation to changing market conditions and requirements. Further, such a process oriented system would enable stronger customer focus and responsiveness to customer needs. Effective communication and knowledge transfer between ISO departments would be facilitated by such process oriented methods and systems.

The methods and systems of the present invention provide the foregoing and other advantages.

SUMMARY OF THE INVENTION

The present invention relates to methods and systems for the management of a bulk electric power market. In an example embodiment of the invention, a set of inter-related automated process streams relating to the bulk electric power market are implemented. A plurality of automated processes for each process stream contained in the set of inter-related process streams may also be implemented. At least one process of each process stream serves as an input to, or output from, at least one other process stream. Each process may comprise: (i) automated inputs; (ii) automated activities; (iii) and automated outputs. Manual inputs may also be provided to at least some of the automated process streams. Further, certain of the automated process streams may require manual activities to occur before the process stream can begin or complete its function.

The process streams are used to automatically manage a bulk electric power market. For example, the outputs of the process streams may be used in at least one of: determining market-based wholesale electric rates; scheduling transmission outages; creating a day-ahead market schedule; and calculating monetary positions of customers involved in settlement of the day-ahead market. Other functions of the various automated process streams will be apparent from the detailed description of the process streams provided herein.

A process stream flow may be provided for each automated process stream. A process flow may be provided for each automated process in each process stream. Textual process descriptions may also be provided which correspond to each automated process flow.

The set of automated process streams may comprise at least some of the following process streams: (i) an outage scheduling process stream; (ii) a market development and analysis process stream; (iii) a day-ahead markets process stream; (iv) a real-time markets process stream; (v) a billing services process stream; (vi) a system models process stream; (vii) a Financial Transmission Rights/Auction Revenue Rights (FTR/ARR) auction process stream; (viii) monitor and mitigate markets process streams; (ix) a serving customers process stream; (x) a system planning process stream; (xi) a corporate finance process stream; (xii) an information technology process stream; (xiii) an internal audit process stream; or (xiv) a manage projects process stream.

BRIEF DESCRIPTION OF THE DRAWINGS

The present invention will hereinafter be described in conjunction with the appended drawing figures, wherein like numerals denote like elements, and.

DETAILED DESCRIPTION OF THE INVENTION

The ensuing detailed description provides exemplary embodiments only, and is not intended to limit the scope, applicability, or configuration of the invention. Rather, the ensuing detailed description of the exemplary embodiments will provide those skilled in the art with an enabling description for implementing an embodiment of the invention. It should be understood that various changes may be made in the function and arrangement of elements without departing from the spirit and scope of the invention as set forth in the appended claims.

Figure 1:
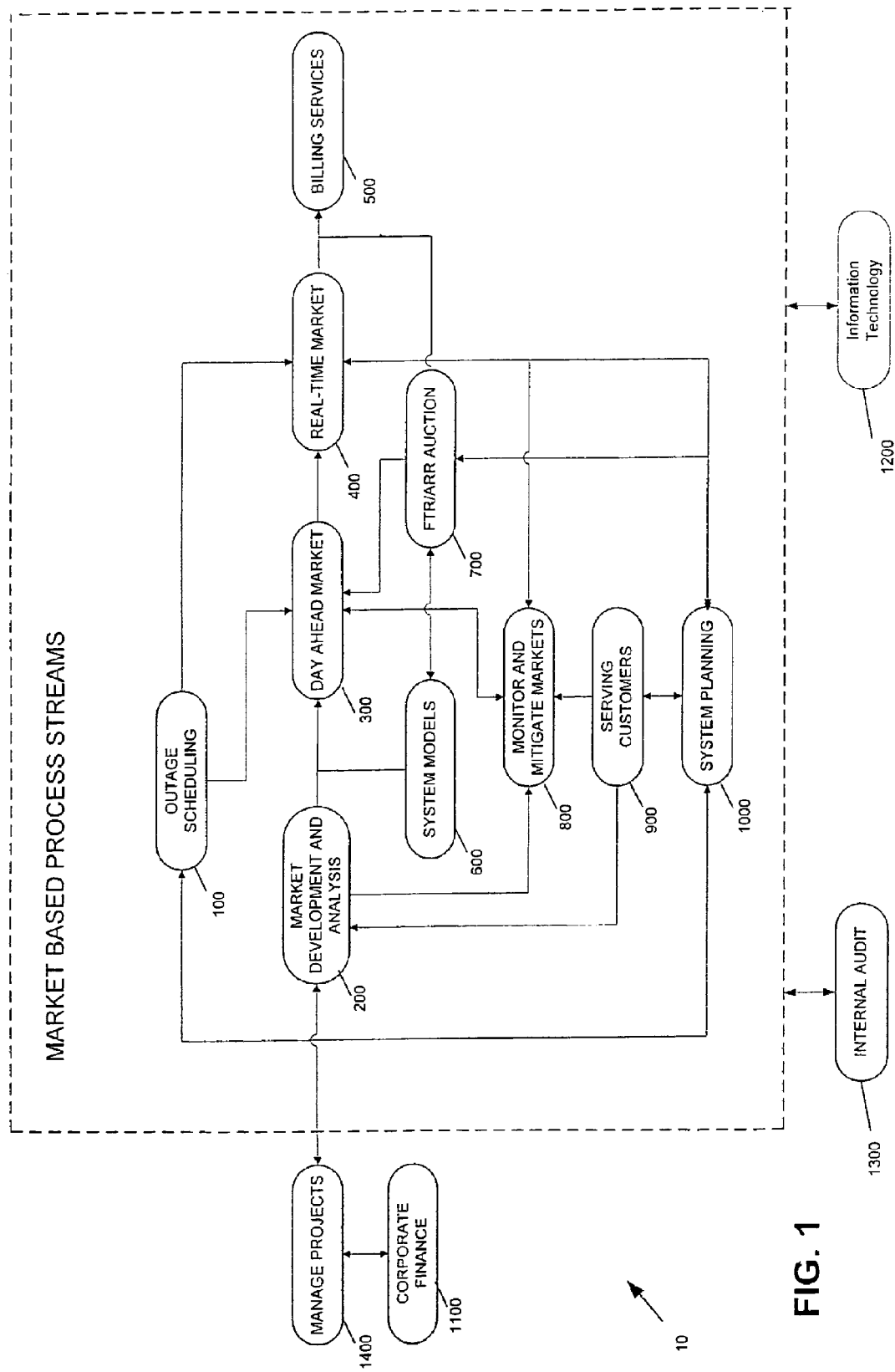
FIG. 1 shows a flow diagram of inter-related process streams in an example embodiment of the invention.

The present invention relates to methods and systems for the management of a bulk electric power market. In an example embodiment of the invention as shown in FIG. 1, a set 10 of inter-related automated process streams 100, 200, 300, 400, 500, 600, 700, 800, 900, 1000, 1100, 1200, 1300, and 1400 relating to the bulk electric power market may be implemented. A plurality of automated processes for each of the process streams contained in the set 10 of inter-related process streams may also be implemented. At least one process of each process stream serves as an input to, or output from, at least one other process stream. Each process may comprise: (i) automated inputs; (ii) automated activities; (iii) and automated outputs.

The automated process streams may be used to automatically manage a bulk electric power market. For example, the output of the process streams may be used in at least one of: determining market-based wholesale electric rates; scheduling transmission outages; creating a day-ahead market schedule; and calculating monetary positions of customers involved in settlement of the day-ahead markets. Other functions of the various automated process streams will be apparent from the detailed description of the process streams provided below in connection with FIGS. 5-18.

In an example embodiment, the present invention may be implemented as a software program carried out on a computerized system. For example, the process streams may each comprise separate software programs designed to function together. The software programs may run independently (e.g., on separate processors or computer systems), with at least one process from each process stream serving as an input to or output from at least one other process stream. Preferably, a single software program may be written to implement the process streams on a networked computer system.

Figure 2:
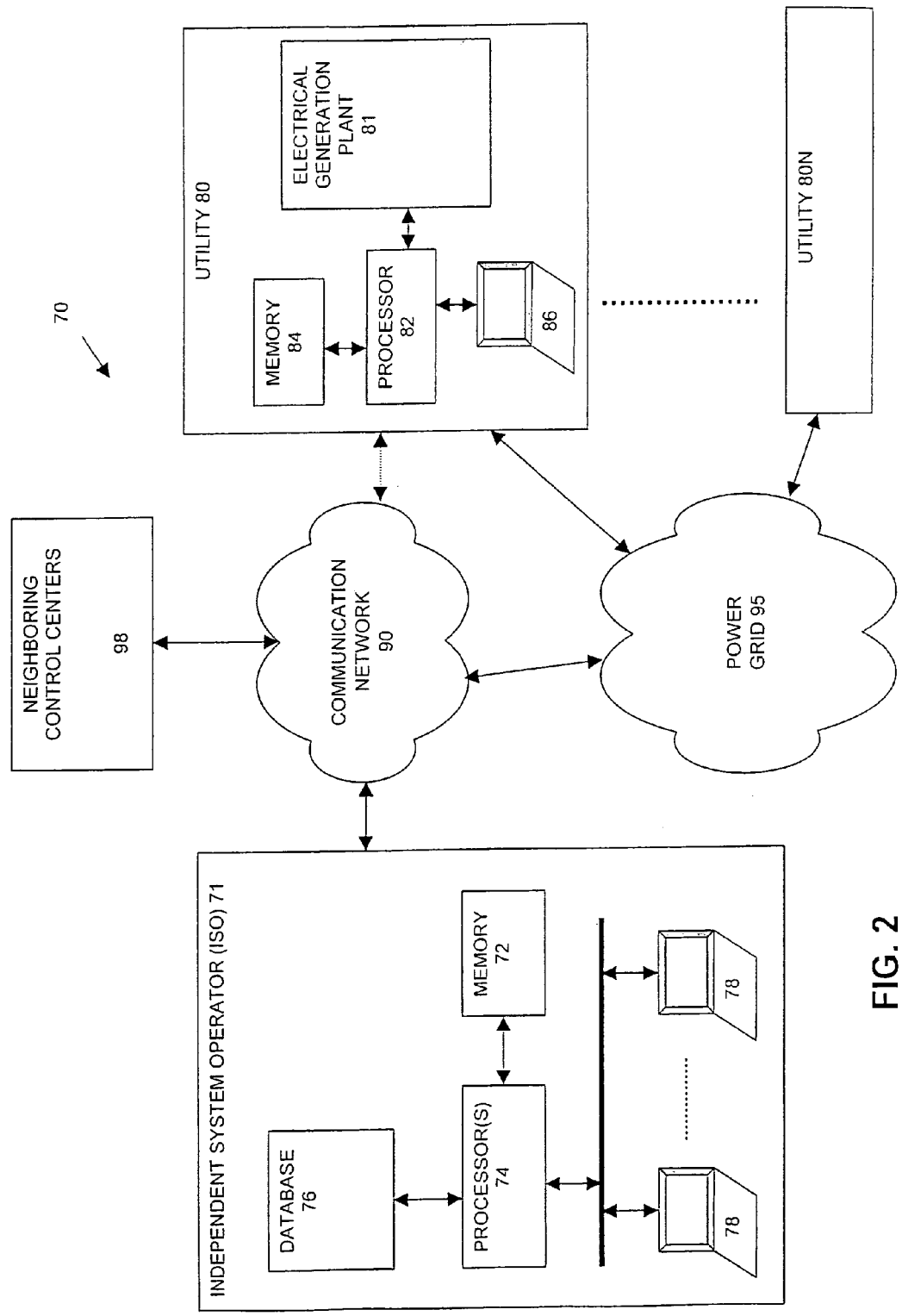
FIG. 2 shows a block diagram of an example embodiment of a system used to implement the present invention.

An example embodiment of such a system used to implement the present invention is shown in FIG. 2. The system 70 may be controlled by an Independent System Operator (ISO) 71 in order to manage the bulk electric power market and control an electric power grid 95. The process streams, and the processes which make up the individual process streams, may be stored in memory 72 and executed at one or more processors 74 at the ISO 71. Data required during execution of the process streams may be stored in database 76 and retrieved therefrom by processor(s) 74. User inputs may be entered via various workstations 78 at ISO 71. The ISO 71 may be in communication with neighboring control centers 98 as providers to or receivers of electricity in the power grid 95, and with utility companies and other entities having the capability of generating electricity (or controlling its consumption) which can be fed into the power grid (all of which are designated for simplicity as Utility 80-80n in FIG. 2) via a communication network 90. The communication network 90 may comprise a network such as the Internet, a wide area network (WAN), the public switched telephone network (PSTN), a private shared telecommunications network (STN), a Satellite phone system, or the like, or a combination of such networks.

Each utility 80 controls an electrical generation plant 81 that is capable of providing electricity to the power grid 95. Each utility 80 may include a processor 82, memory 84 accessible by the processor 82, and at least one workstation 86 via which the utility 80 can control the electrical generation plant 81. Each utility 80-80n can communicate with ISO 71 via network 90. For example, each utility 80-80n may register with ISO 71 via the communication network 90, provide ISO 71 with information regarding capabilities of its electrical generation plant 81, submit bids and offers to ISO 71, request outage scheduling from ISO 71, and provide other information to ISO 71 which may be necessary to execute the various process streams as discussed below. Further, ISO 71 may, either directly via the communication network, or indirectly through the utilities 80-80n, monitor the power grid 95, including but not limited to obtaining telemetering data from power generators and users in the grid 95, monitoring total power usage of the grid 95, monitoring outages and transmission loading in the grid 95, and monitoring and engaging in electricity transactions with neighboring control centers 98.

Figure 3:
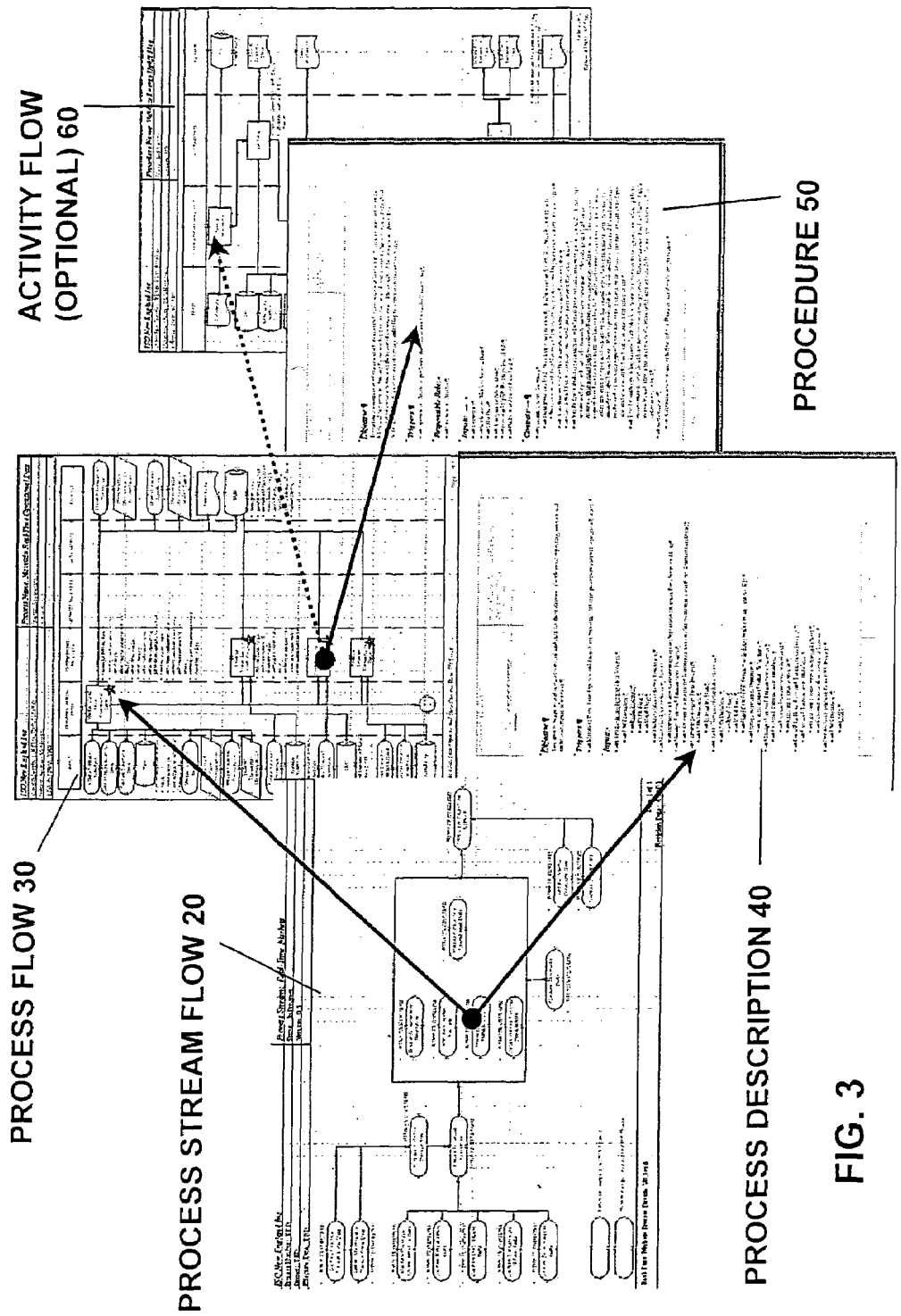
FIG. 3 shows an illustration of the inter-relationships between process streams, process flows, process descriptions, procedures, and activity flows in an example embodiment of the invention.

As shown in FIG. 3, a process stream flow 20 may be provided for each automated process stream. A process flow 30 may be provided for each automated process in each process stream. Textual process descriptions 40 may also be provided which correspond to each process flow. Process flows and textual process descriptions may be stored on database 76 and retrieved via workstations 78.

Manual inputs may also be provided to at least some of the automated process streams, (e.g., via workstations 78). Further, certain of the automated process streams may require manual activities to occur before the process stream can begin or complete its function. As shown in FIG. 3, a procedure 50 for at least one manual activity of at least one process may also be provided. The procedure 50 may be described in a textual procedural documentation for the manual activity, which may also be stored on database 76 and accessible via one of the workstations 78.

As shown in FIG. 1, the set 10 of automated process streams may comprise at least some of the following process streams: (i) an outage scheduling process stream 100; (ii) a market development and analysis process stream 200; (iii) a day-ahead markets process stream 300; (iv) a real-time markets process stream 400; (v) a billing services process stream 500; (vi) a system models process stream 600; (vii) an FTR/ARR auction process stream 700; (viii) monitor and mitigate markets process streams 800, 850, 860, and 870; (ix) a serving customers process stream 900; (x) a system planning process stream 1000; (xi) a corporate finance process stream 1100; (xii) an information technology process stream 1200; (xiii) an internal audit process stream 1300; or (xiv) a manage projects process stream 1400.

As can be seen in FIG. 1, process streams 100-1000 are market based process streams. In other words, these process streams are ones that directly impact the management of the bulk electric power market. Process streams 1100-1400 are support process streams which provide support for the market based process streams. Process streams 1100-1400 do not directly affect the management of the bulk electric power market. Rather, process streams 1100-1400 may provide various support services, such as providing data, auditing functions, system security, project management, and others, as will be apparent from the processes included within each process stream.

Figure 4:
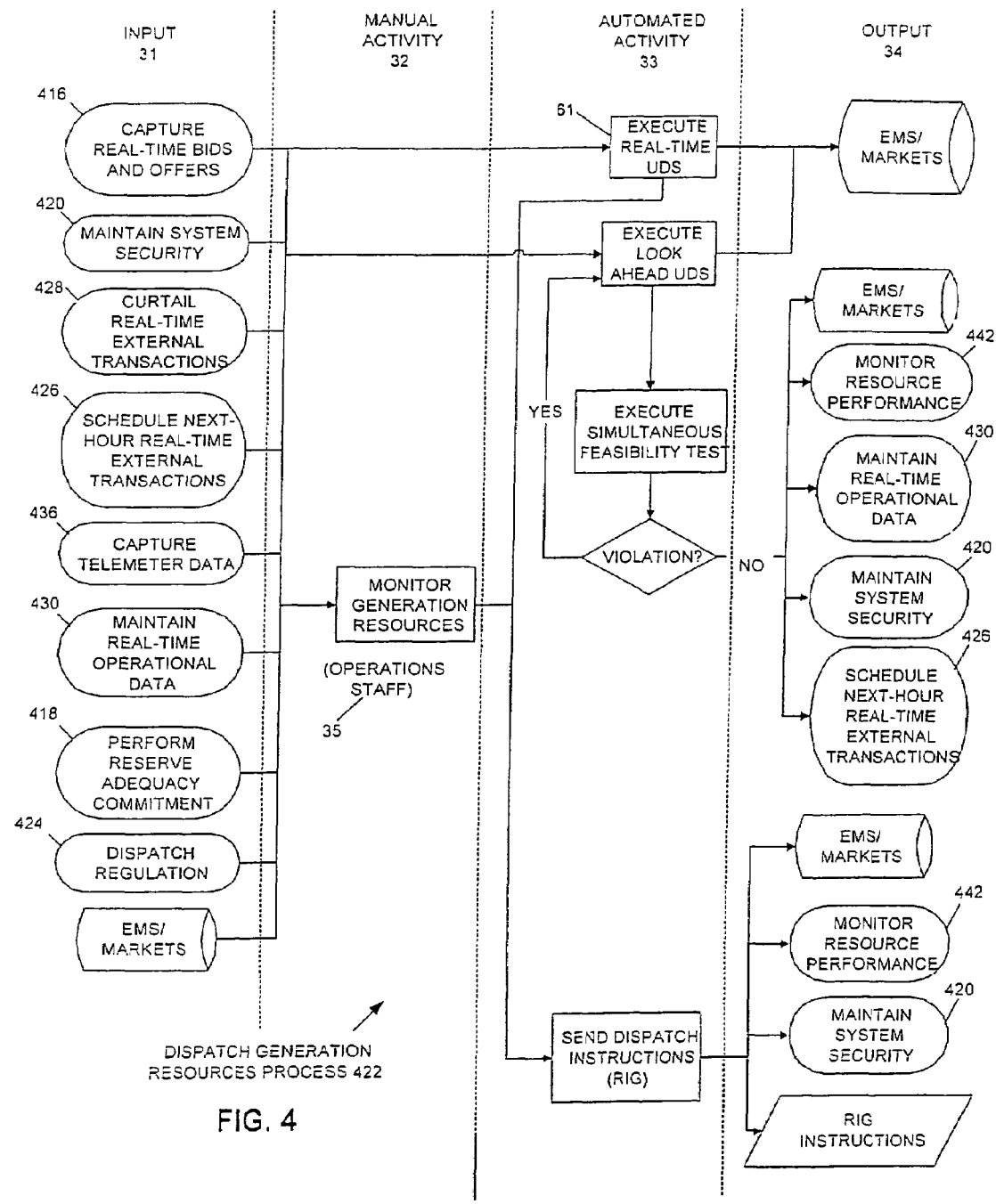
FIG. 4 shows an illustration of a process flow in accordance with an example embodiment of the invention.

An example of a process flow 30 (FIG. 3) is shown in FIG. 4. The process flow shown in FIG. 4 is the process flow for the dispatch generation resources process 422 of the real time markets process stream 400 (described in detail in connection with FIG. 8 below).

The process flow for each process may provide at least one of: (i) the relationship between inputs (column 31), activities (e.g., manual activities of column 32 and automated activities of column 33), and outputs (column 34) of the process; (ii) any dependency of the process (in this case dispatch generation resources process 422) on other processes (e.g., such as processes 416, 420, 428, 426, 436, 430, 418, 424, and 442); (iii) an identification of the function (e.g., function 61 (execute real-time UDS) in automated activities in column 33) or department 35 (for manual activities in column 32) performing each activity of the process, or the like. The process flow may be stored on database 76 for reference by ISO personnel via workstation 78.

The textual process descriptions (e.g., process description 40 of FIG. 3) may provide a description of at least one of: (i) objectives of each process; (ii) triggers corresponding to each process; (iii) inputs to each process; (iv) automated and manual activities identified in each process; (v) outputs for each process; (vi) controls for each process; (vii) performance measures for each process; (viii) applications for each process; (ix) systems for each process; (x) tools for each process; (xi) related documents for each process, or the like. The textual process descriptions may be stored on database 76 for reference by ISO personnel via workstation 78.

The textual procedural documentation (e.g., procedure documentation 50 of FIG. 3) may include descriptions of at least one of: (i) objectives of the activity; (ii) triggers for the activity; (iii) responsible role for the activity; (iv) inputs to the activity; (v) procedural detail for the activity; (vi) outputs from the activity; (vii) controls for the activity; (viii) performance measures for the activity; (ix) applications for the activity; (x) systems for the activity; (xi) tools for the activity; (xii) related documents for the activity, or the like. The textual procedural documentation may be stored on database 76 for reference by ISO personnel via workstation 78.

Figure 5:
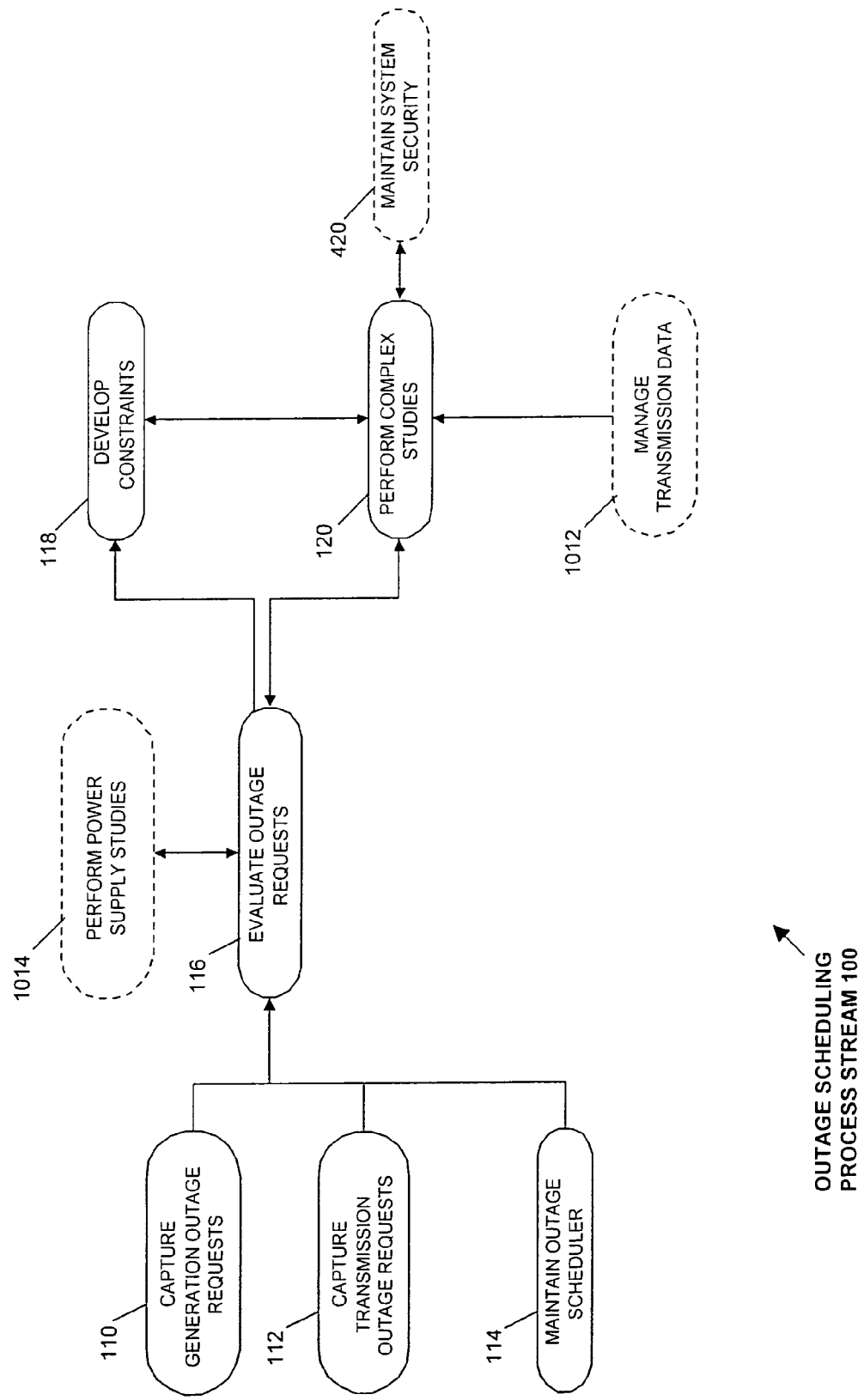
FIG. 5 shows an example embodiment of an outage scheduling process stream in accordance with the invention.

FIGS. 5-18 illustrate example embodiments of a process stream flow 20 for each automated process stream 100-1400. It should be appreciated that the processes shown in each process stream 100-1400 are identified by reference numbers associated with that process stream. For example, FIG. 5 shows an example embodiment of an outage scheduling process stream 100. The processes comprising the outage scheduling process stream 100 are identified by reference numerals in the 100's (i.e. 110, 112, 114, 116, 118, and 120). The processes from other process streams which serve as an input to or output from the outage scheduling process stream 100 are shown in dashed lines and are identified by reference numerals associated with those other process streams. For example, in FIG. 5, process 420 is shown in dashed lines and is part of real time markets process stream 400.

As shown in FIG. 5, the outage scheduling process stream 100 may comprise processes that capture and maintain generation and transmission outage information. This information may be obtained by ISO 71 from utilities 80-80n via network 90 and stored in database 76 for use when executing outage scheduling process stream 100. Outage information is a key component of power system information, and is used to determine availability when dispatching units. In addition to capturing the outage information, this process stream 100 also includes activities that evaluate outage requests received by ISO 71 from a utility 80, and activities that develop constraints that are used in the day-ahead and real-time markets process streams.

As can be seen from FIG. 5, the processes that capture and maintain generation and transmission outage information may include at least some of: a capture generation outage requests process 110, a capture transmission outage requests process 112, a maintain outage scheduler process 114, an evaluate outage requests process 116, a develop constraints process 118, or a perform complex studies process 120. At least one of a perform power supply studies process 1014, a manage transmission data process 1012, or a maintain system security process 420 may serve as at least one of an input to or an output from at least one corresponding process of the outage scheduling process stream 100.

Figure 6:
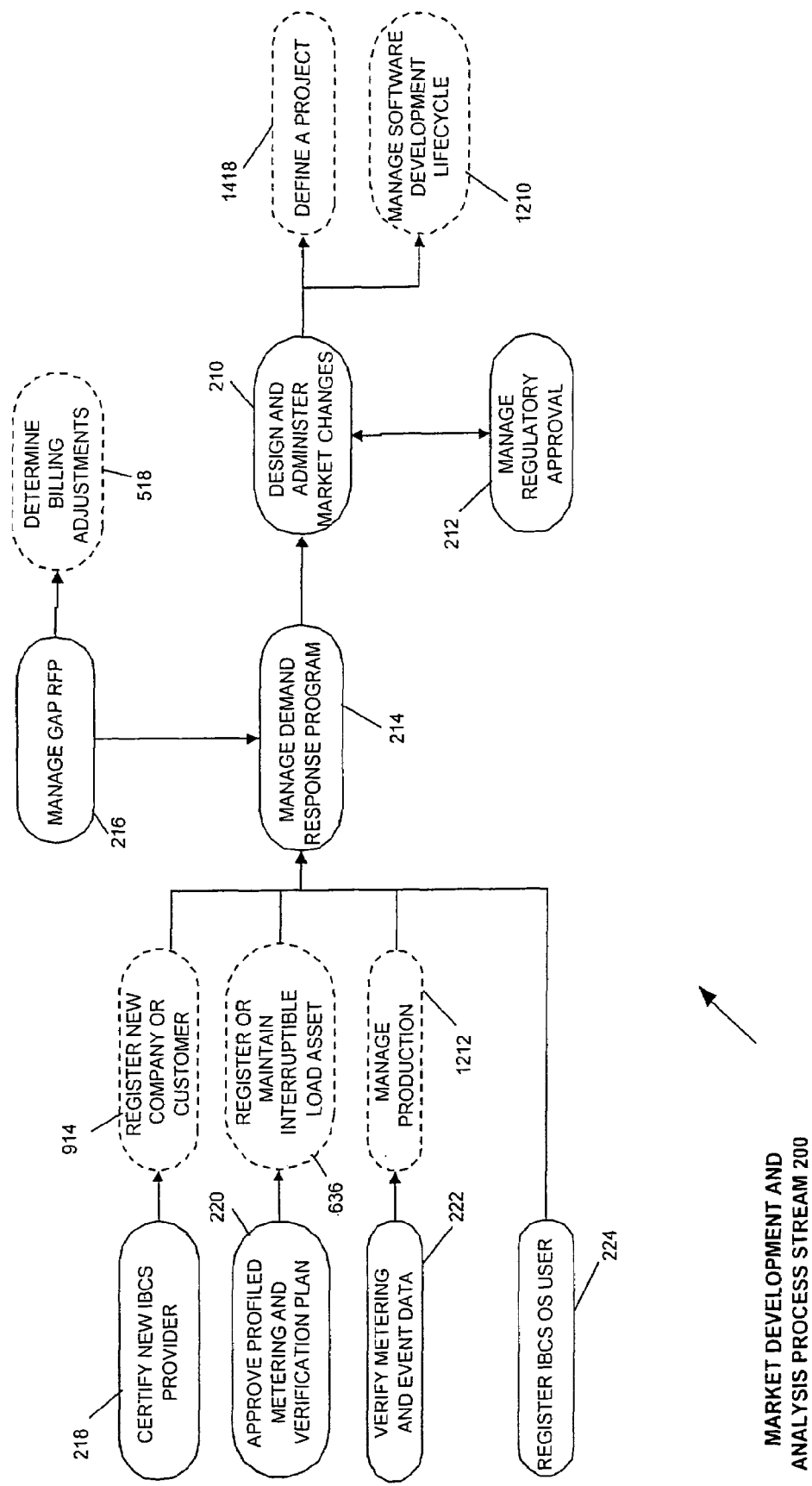
FIG. 6 shows an example embodiment of a market development and analysis process stream in accordance with the invention.

FIG. 6 shows an example embodiment of a market development and analysis process stream 200. The market development and analysis process stream 200 may comprise processes that describe how to undertake changes to a market design. This process stream 200 includes processes that are implemented when notification triggers new market design analysis. Such notification may be received from any number of sources (not shown in FIG. 2) via the communication network 90, including NEPOOL Participants, regulators, ISO-NE emergency filings, or any new conceptual input. The market development and analysis process stream 200 also includes a process for managing regulatory approvals for new market designs as well as other types of filings. It is included as a separate process stream because of the unique and complicated nature of the tasks involved. New markets and regulatory approval involve large numbers of stakeholders, with a fairly well-defined sequence of events.

As shown in FIG. 6, the processes for changing a market design may include at least one of: a design and administer market changes process 210, a manage regulatory approval process 212, a manage demand response program process 214, a manage capacity shortfall (GAP) Request for Proposal (RFP) process 216, a certify new Internet Based Communication System (IBCS) provider process 218, an approve profiled metering and verification plan process 220, a verify metering and event data process 222, or a register IBCS Open Source (OS) user process 224. At least one of a register new company or customer process 914, a register or maintain interruptible load asset process 636, a manage production process 1212, a determine billing adjustments process 518, a define a project process 1418, or a manage software development lifecycle process 1210 may serve as at least one of an input to or an output from at least one corresponding process of the market development and analysis process stream 200.

Figure 7:
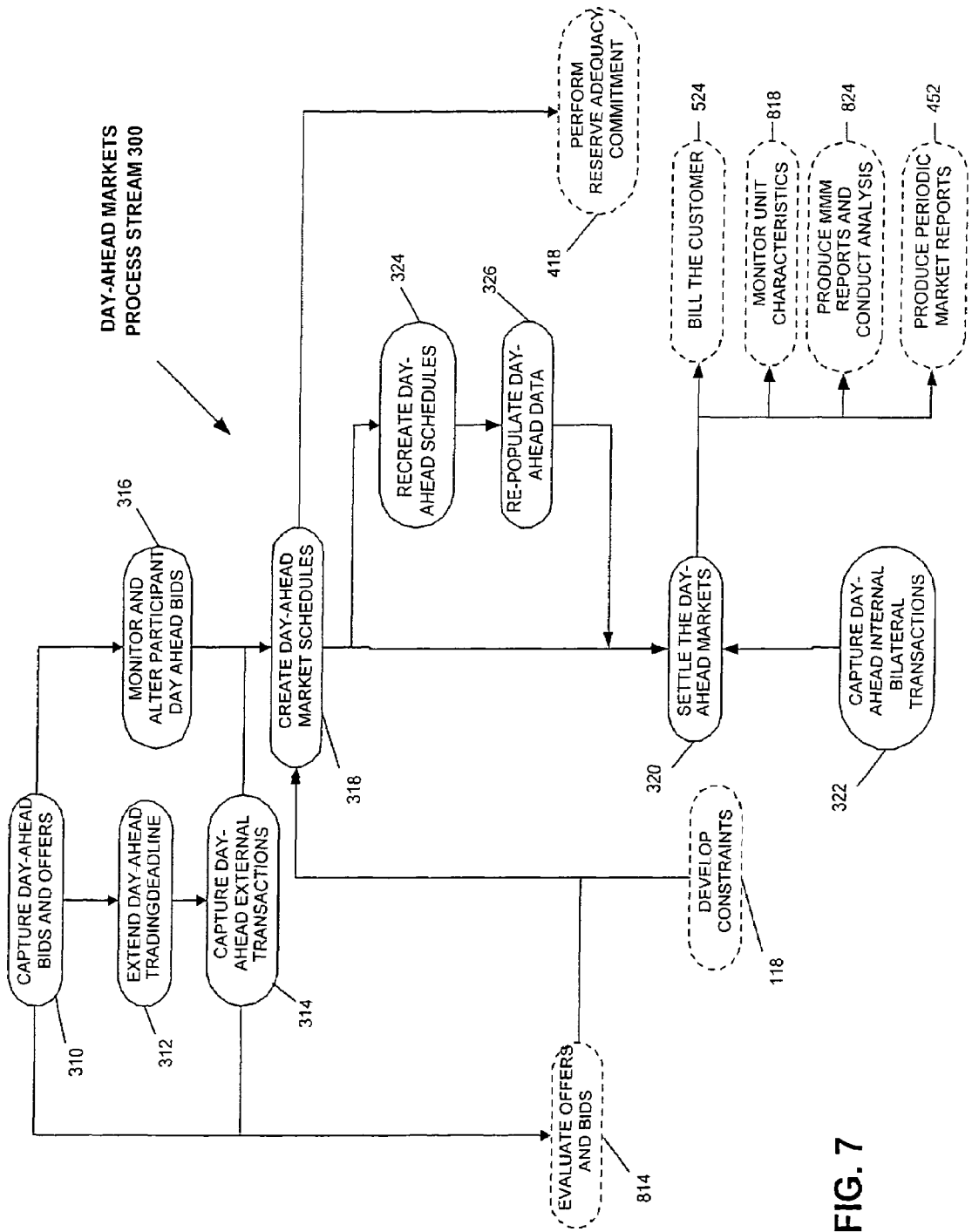
FIG. 7 shows an example embodiment of a day-ahead markets process stream in accordance with the invention.

FIG. 7 shows an example embodiment of a day-ahead markets process stream 300. The day-ahead markets process stream 300 may comprise daily processes that lead to the settlement of the day-ahead markets. This process stream 300 includes activities beginning with the capturing of day-ahead bids and offers as well as day-ahead external transactions.

Day-ahead bids and offers may be received from utilities 80-80n via communication network 90 and stored in database 76 for use in executing the day-ahead markets process stream 300. The schedule of day-ahead external transactions may also be maintained in database 76. This data may be used to automatically create a day-ahead market schedule, including the calculation of day-ahead Locational Marginal Prices (LMPs) and the creation of financially binding transactions. The settle the day-ahead markets 320 then calculates the monetary positions for the customers involved in the market.

As shown in FIG. 7, the processes that lead to the settlement of the day-ahead markets may include at least some of: a capture day-ahead bids and offers process 310, an extend day-ahead trading deadline process 312, a capture day-ahead external transactions process 314, a monitor and alter participant day-ahead bids process 316, a create day-ahead market schedules process 318, a settle the day-ahead markets process 320, a capture day-ahead internal bilateral transactions process 322, a recreate day-ahead schedules process 324, or a re-populate day-ahead data process 326. At least one of an evaluate offers and bids process 814, a develop constraints process 118, a perform reserve adequacy commitment process 418, a bill the customer process 524, a monitor unit characteristics process 818, a produce Monitor and Mitigate Markets (MMM) reports and conduct analysis process 824, or a produce periodic market reports process 452 may serve as at least one of an input to or an output from at least one corresponding process of the day-ahead markets process stream 300.

Figure 8:
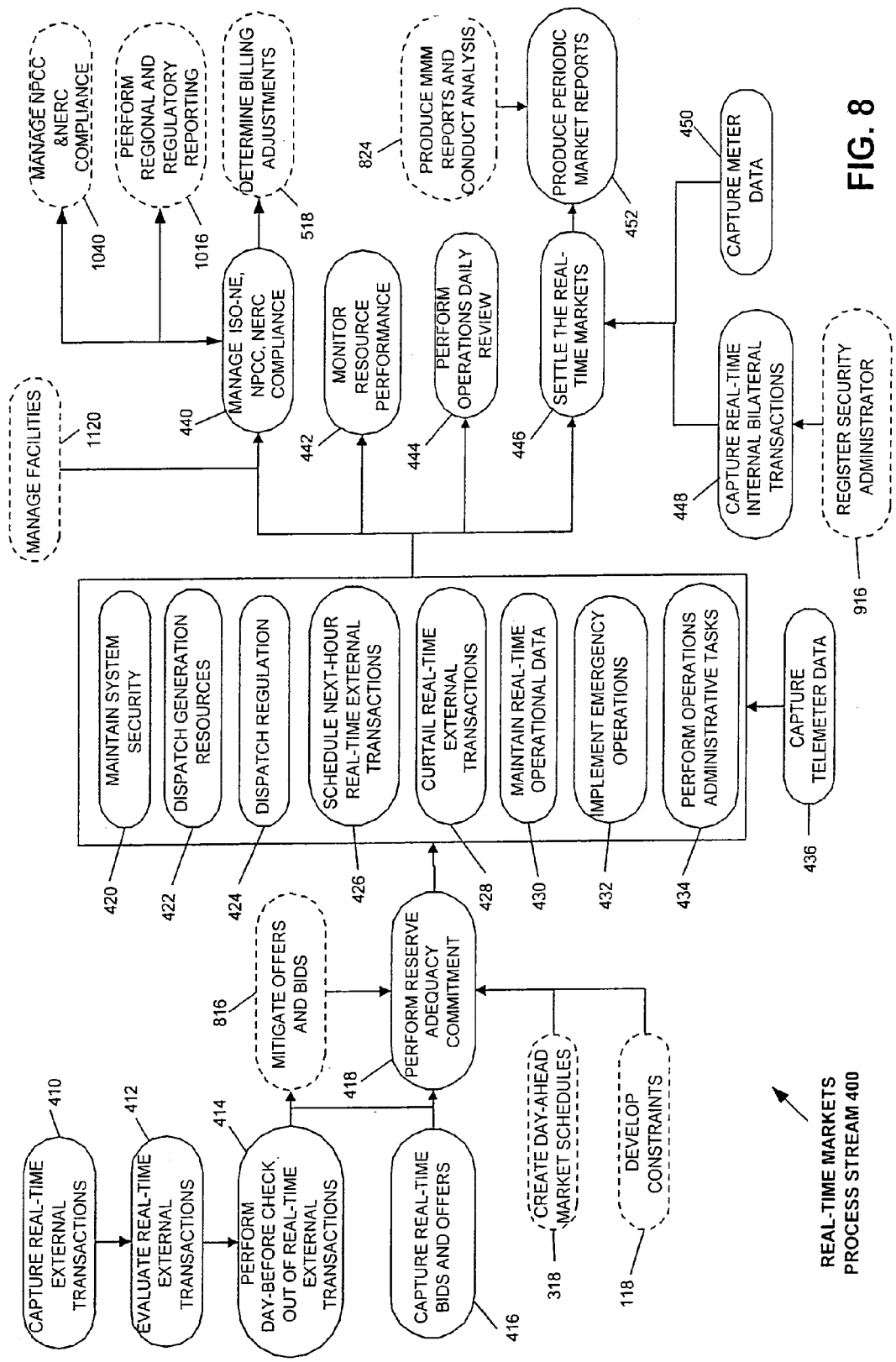
FIG. 8 shows an example embodiment of a real-time markets process stream in accordance with the invention.

FIG. 8 shows an example embodiment of a real-time markets process stream 400. The real-time markets process stream 400 may comprise daily and minute-to-minute automated processes that lead to settling of real-time markets. The real-time markets process stream 400 includes activities beginning with the capturing of real-time bids and offers from utilities 80-80n as well as real-time external transactions. Real-time bids and offers received at ISO 71 may be stored in database 76 for use in executing the real-time markets process stream 400. This process stream 400 also includes minute-to-minute iterative processes including the maintaining of system security, dispatching of generation and regulation resources, scheduling of next-hour real-time external transactions, maintaining of real-time data and implementing of emergency operations if needed. The settle the real-time markets process 446 then automatically calculates the monetary positions for the customers involved in the market. Other tasks are included in this process stream, such as the monitoring of resource performance and daily operations review and reporting.

As shown in FIG. 8, the daily and minute-to-minute processes that lead to settling of real-time markets may include at least some of: a capture real-time external transactions process 410, an evaluate real-time external transactions process 412, a perform day-before check out of real-time external transactions process 414, a capture real-time bids and offers process 416, a perform reserve adequacy commitment process 418, a maintain system security process 420, a dispatch generation resources process 422, a dispatch regulation process 424, a schedule next-hour real-time external transactions process 426, a curtail real-time external transactions process 428, a maintain real-time operational data process 430, an implement emergency operations administrative tasks process 434, a capture telemeter data process 436, a manage Independent System Operator (ISO)/Northeast Power Coordinating Council (NPCC)/North American Electric Reliability Council (NERC) compliance process 440, a monitor resource performance process 442, a perform operations daily review process 444, a settle the real-time markets process 446, a capture real-time internal bilateral transactions process 448, a capture meter data process 450, or a produce periodic market reports process 452. At least one of a mitigate offers and bids process 816, a create day-ahead market schedules process 318, a develop constraints process 118, a manage facilities process 1120, a register security administrator process 916, a manage NPCC and NERC compliance process 1040, a perform regional and regulatory reporting process 1016, a determine billing adjustments process 518, or a produce MMM reports and conduct analysis process 824 may serve as at least one of an input to or an output from at least one corresponding process of the real-time markets process stream 400.

Figure 9:
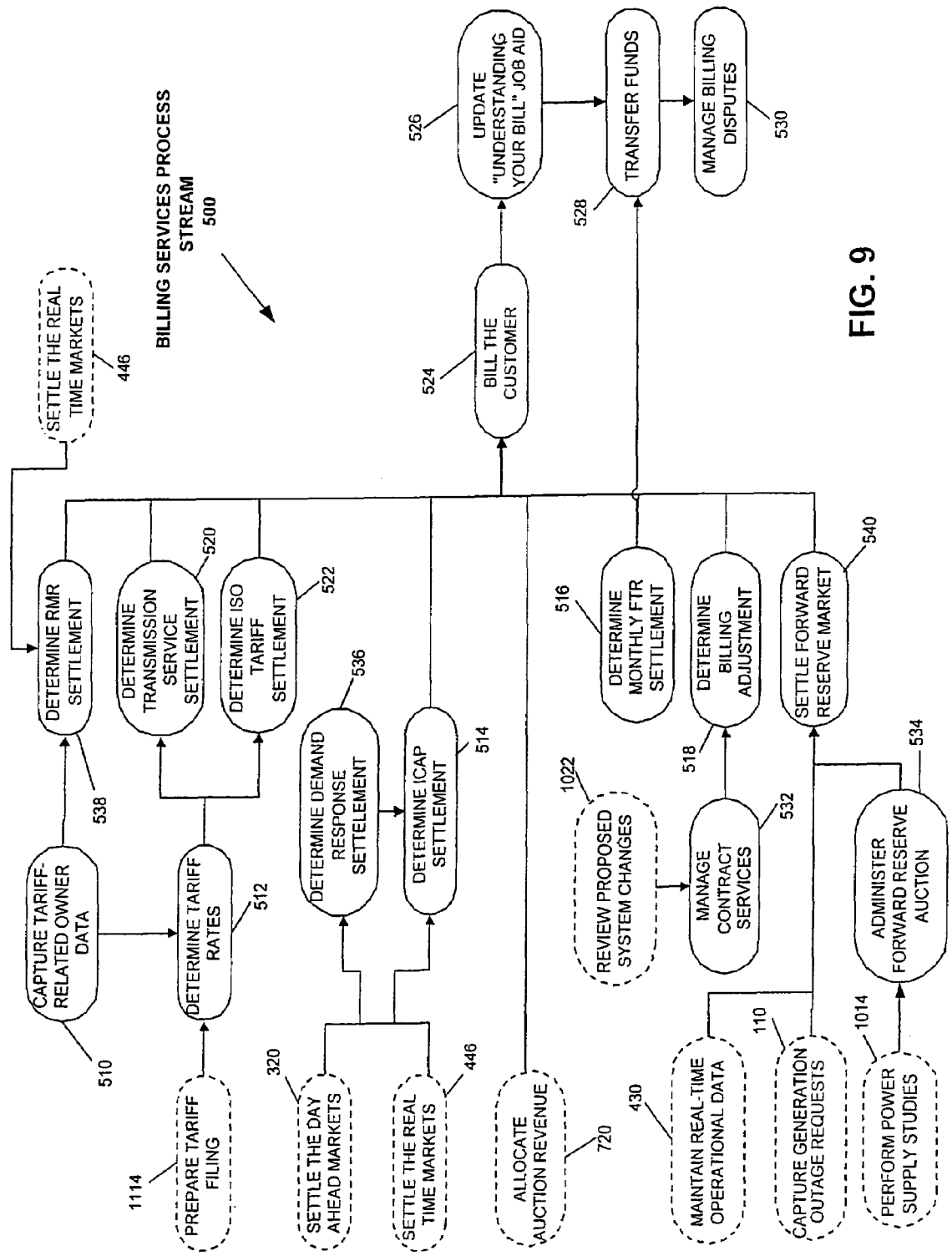
FIG. 9 shows an example embodiment of a billing services process stream in accordance with the invention.

FIG. 9 shows an example embodiment of a billing services process stream 500. The billing services process stream 500 may comprise automated processes occurring on a monthly basis to prepare and issue bills to customers. The billing services process stream 500 includes processes which occur after all daily settlements have been completed and recorded (e.g., in database 76) for a given month. It includes transmission service and ISO tariff preparation and settlement, installed capacity (ICAP) and financial transmission rights (FTR) settlements. This process stream also includes the steps necessary to analyze cash reserve requirements and electronically transfer the funds after the bills have been issued, as well as the process used to analyze customer requests for billing adjustments.

As shown in FIG. 9, the processes occurring on a monthly basis to prepare and issue bills to customers may include at least some of: a capture tariff-related owner data process 510, a determine tariff rates process 512, a determine ICAP settlement process 514, a determine monthly FTR settlement process 516, a determine billing adjustment process 518, a determine transmission service settlement process 520, a determine ISO tariff settlement process 522, a bill the customer process 524, an update "understanding your bill" job aid process 526, a transfer funds process 528, a manage billing disputes process 530, a manage contract services process 532, an administer forward reserve auction process 534, a determine demand response settlement process 536, a determine Reliability Must Run (RMR) settlement process 538, or a settle forward reserve market process 540. At least one of a settle the day-ahead markets process 320, a settle the real-time markets process 446, an allocate auction revenue process 720, a prepare tariff filing process 1114, a capture generation outage requests process 110, a perform power supply studies process 1014, or a review proposed system changes process 1022 may serve as at least one of an input to or an output from at least one corresponding process of the billing services process stream 500.

Figure 10:
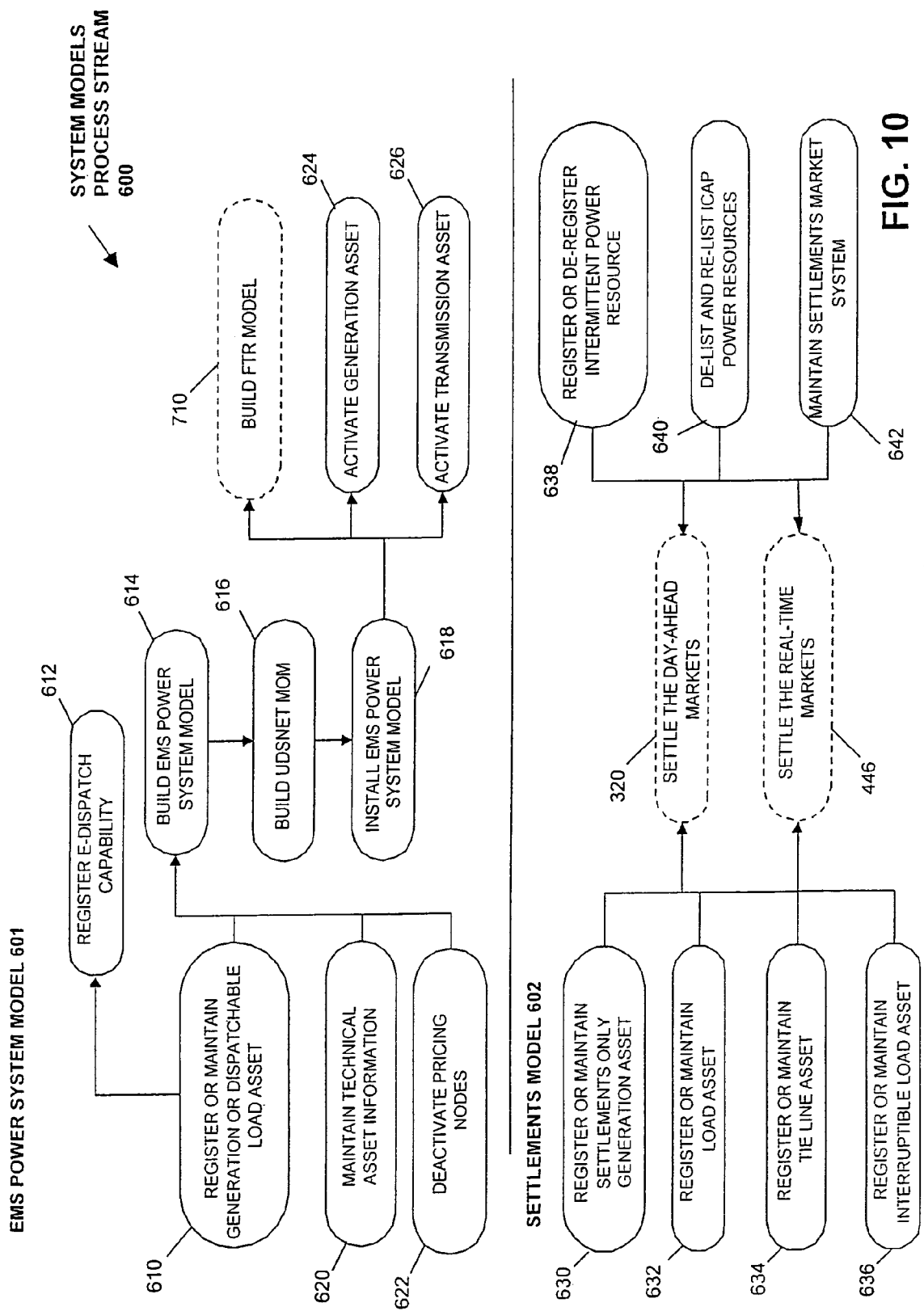
FIG. 10 shows an example embodiment of a system models process stream in accordance with the invention.

FIG. 10 shows an example embodiment of a system models process stream 600. The system models process stream 600 may include an Energy Management System (EMS) power system model 601 and a settlements model 602. The system model process stream 600 may comprise processes that build and maintain various power system models that form a foundation for other process streams. These processes enable different types of assets (generation, dispatchable load, transmission, technical asset, tie line, and the like) to be added to, or removed from, the power system. For example, a utility 80 may register its assets with ISO 71 and thereafter be allowed to provide power to the power grid 95. ISO 71 may also register new power users and add their corresponding loads into the power grid 95.

As shown in FIG. 10, the processes that build and maintain the various power system models may include at least some of: a register or maintain generation or dispatchable load asset process 610, a register e-dispatch capability process 612, a build EMS power system model process 614, a build Unit Dispatch System (UDS) network database (net mom) process 616, an install EMS power system model process 618, a maintain technical asset information process 620, a deactivate pricing nodes process 622, an activate generation asset process 624, an activate transmission asset process 626, a register or maintain settlements only generation asset process 630, a register or maintain load asset process 632, a register or maintain tie line asset process 634, a register or maintain interruptible load asset process 636, a register or de-register intermittent power resource process 638, a de-list and re-list ICAP power resources process 640, or a maintain settlements market system process 642. At least one of a build FTR model process 710, a settle the day-ahead markets process 320, or a settle the real-time markets process 446 may serve as at least one of an input to or an output from at least one corresponding process of the system models process stream 600.

Figure 11:
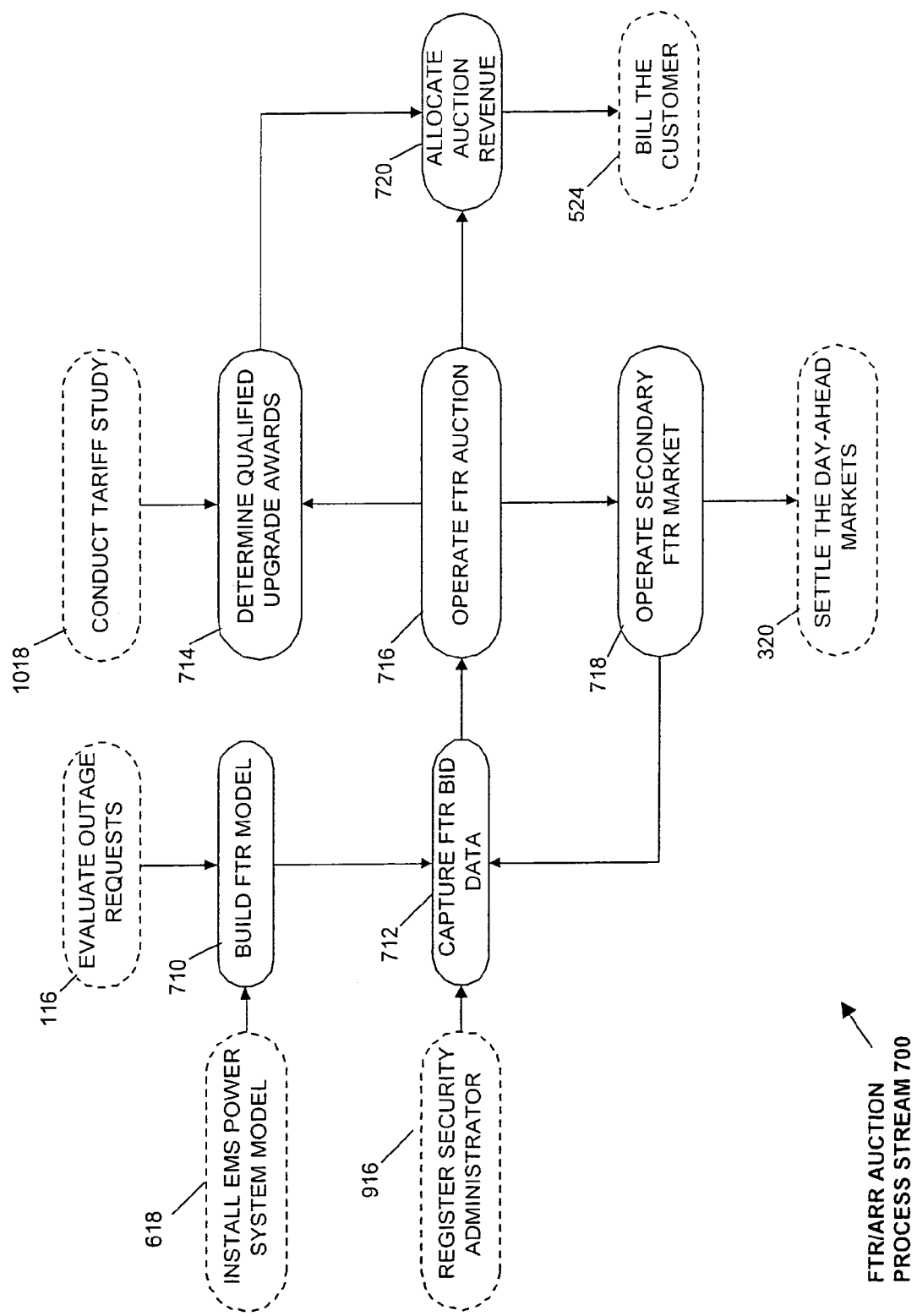
FIG. 11 shows an example embodiment of an FTR/ARR auction process stream in accordance with the invention.

FIG. 11 shows an example embodiment of an FTR/ARR auction process stream 700. The FTR/ARR auction process stream 700 may comprise processes that govern the FTR auction and allocation of the auction revenues. This process stream 700 includes activities to provide a proper model representative of the defined FTR auction period, capture and validate FTR bid data received by ISO 71 from utilities 80-80n, and operate the FTR auction to ensure an appropriate outcome. Bid data from the utilities 80-80n may be stored in database 76 for use in executing the FTR/ARR auction process stream 700. The FTR/ARR auction process stream 700 also includes a process for operating the secondary FTR market, which provides the ability for FTR holders to register secondary trades. Further, additional processes allocate the FTR auction revenues to eligible entities with recognition of certain transmission upgrades that allow additional FTRs to be auctioned.

As shown in FIG. 11, the processes that accomplish the FTR auction and allocation of the auction revenues may include at least some of: a build FTR model process 710, a capture FTR bid data process 712, a determine qualified upgrade awards process 714, an operate FTR auction process 716, an operate secondary FTR market process 718, or an allocate auction revenue process 720. At least one of an install EMS power system model process 618, a register security administrator process 916, an evaluate outage requests process 116, a conduct tariff study process 1018, a settle the day-ahead markets process 320, or a bill the customer process 524 may serve as at least one of an input to or an output from at least one corresponding process of the FTR/ARR auction process stream 700.

Figure 12A:
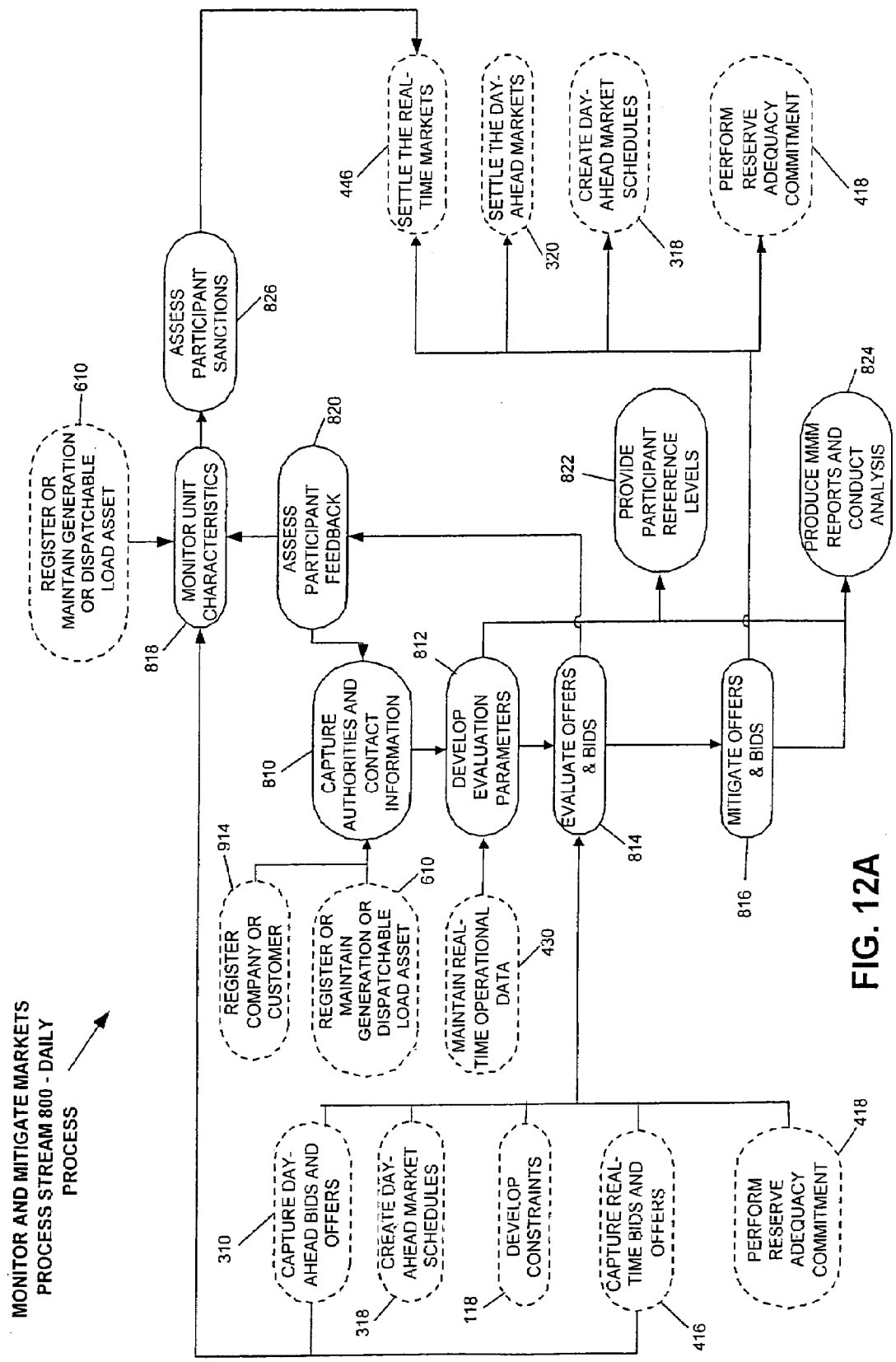
FIG. 12A shows an example embodiment of a monitor and mitigate markets process stream which takes place on a daily basis in accordance with the invention.

FIG. 12A shows an example embodiment of a monitor and mitigate markets process stream 800 which takes place on a daily basis. The monitor and mitigate markets process stream 800 may comprise processes that monitor market activity and mitigate market effects that would distort competitive outcomes. This process stream 800 includes activities describing both the development of evaluation parameters for the various bid and offer data (which may be stored in database 76), and the evaluation and mitigation of bids and offers as necessary. This process stream 800 also includes activities to verify that market operations and performance are proper and efficient through ongoing analyses and reporting. Reports may be automatically generated by processor 74, or manually requested via workstation 78.

As shown in FIG. 12A, the daily processes that monitor market activity and mitigate market effects that would distort competitive outcomes may include at least some of: a capture authorities and contact information process 810, a develop evaluation parameters process 812, an evaluate offers and bids process 814, a mitigate offers and bids process 816, a monitor unit characteristics process 818, an assess participant feedback process 820, a provide participant reference levels process 822, a produce MMM reports and conduct analysis process 824, or an assess participant sanctions process 826. At least one of a capture day-ahead bids and offers process 310, a create day-ahead market schedules process 318, a develop constraints process 118, a capture real-time bids and offers process 416, a perform reserve adequacy commitment process 418, a maintain real-time operational data process 430, a settle the day-ahead markets process 320, a settle the real-time markets process 446, a register company or customer process 914, or a register or maintain generation or dispatchable load asset process 610 may serve as at least one of an input to or an output from at least one corresponding process of the monitor and mitigate markets process stream 800.

Figure 12B:
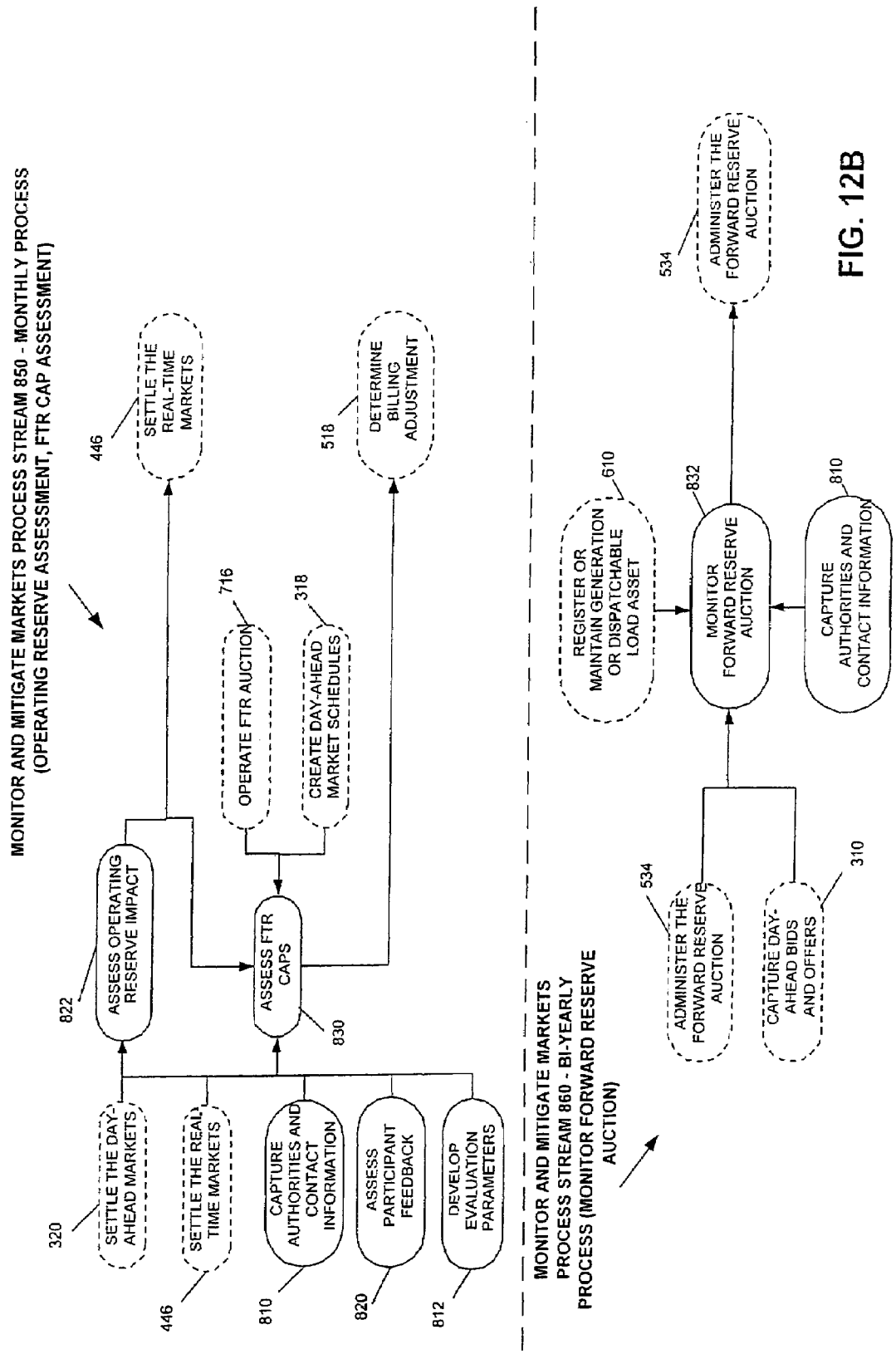
FIG. 12B shows an example embodiment of monitor and mitigate markets process streams which takes place on a monthly and bi-yearly basis in accordance with the invention.

FIG. 12B shows an example embodiment of a monitor and mitigate markets process stream 850 which takes place on a monthly basis. The monthly monitor and mitigate markets process stream 850 may include processes that assess FTR caps and operating reserve.

As shown in FIG. 12B, the processes of the monthly monitor and mitigate markets process stream 850 may include at least some of: a capture authorities and contact information process 810, a develop evaluation parameters process 812, an assess participant feedback process 820, an assess operating reserve impact process 822, or an assess FTR caps process 830. At least one of a settle the day-ahead markets process 320, a settle the real time markets process 446, a operate FTR auction process 716, a create day-ahead market schedules process 318, or a determine billing adjustment process 518 may serve as at least one of an input to or an output from at least one corresponding process of the monitor and mitigate markets process stream 850.

FIG. 12B also shows an example embodiment of a monitor and mitigate markets process stream 860 which takes place on a bi-yearly basis. The bi-yearly monitor and mitigate markets process stream 860 comprises processes that monitor the forward reserve auction.

As shown in FIG. 12B, the processes of the bi-yearly monitor and mitigate markets process stream 860 may include at least one of: a capture authorities and contact information process 810, and a monitor forward reserve auction process 832. At least one of an administer the forward reserve auction process 534, a capture day-ahead offers process 310, or a register or maintain generation or dispatchable load asset 610 may serve as at least one of an input to or an output from at least one corresponding process of the monitor and mitigate markets process stream 860.

Figure 12C:
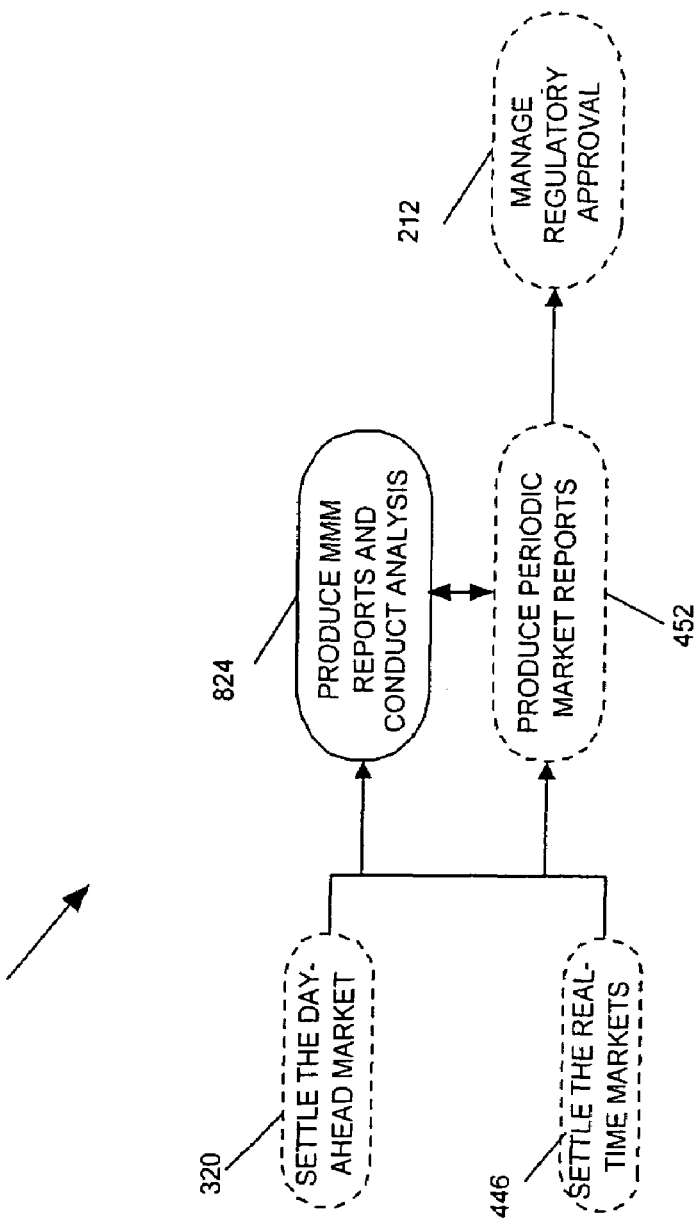
FIG. 12C shows an example embodiment of a monitor and mitigate markets process stream which takes place on a periodic basis in accordance with the invention.

FIG. 12C shows an example embodiment of a monitor and mitigate markets process stream 870 which takes place on a periodic basis. The periodic monitor and mitigate markets process stream 870 includes processes that undertake periodic and ad hoc market analysis and reporting.

As shown in FIG. 12C, the processes of the periodic monitor and mitigate markets process stream 870 may include at least a produce MMM reports and analysis process 824. At least one of a settle the day-ahead markets process 320, a settle the real time markets process 446, a produce periodic market reports process 452, or a manage regulatory approval process 212 may serve as at least one of an input to or an output from at least one corresponding process of the monitor and mitigate markets process stream 870.

Figure 13:
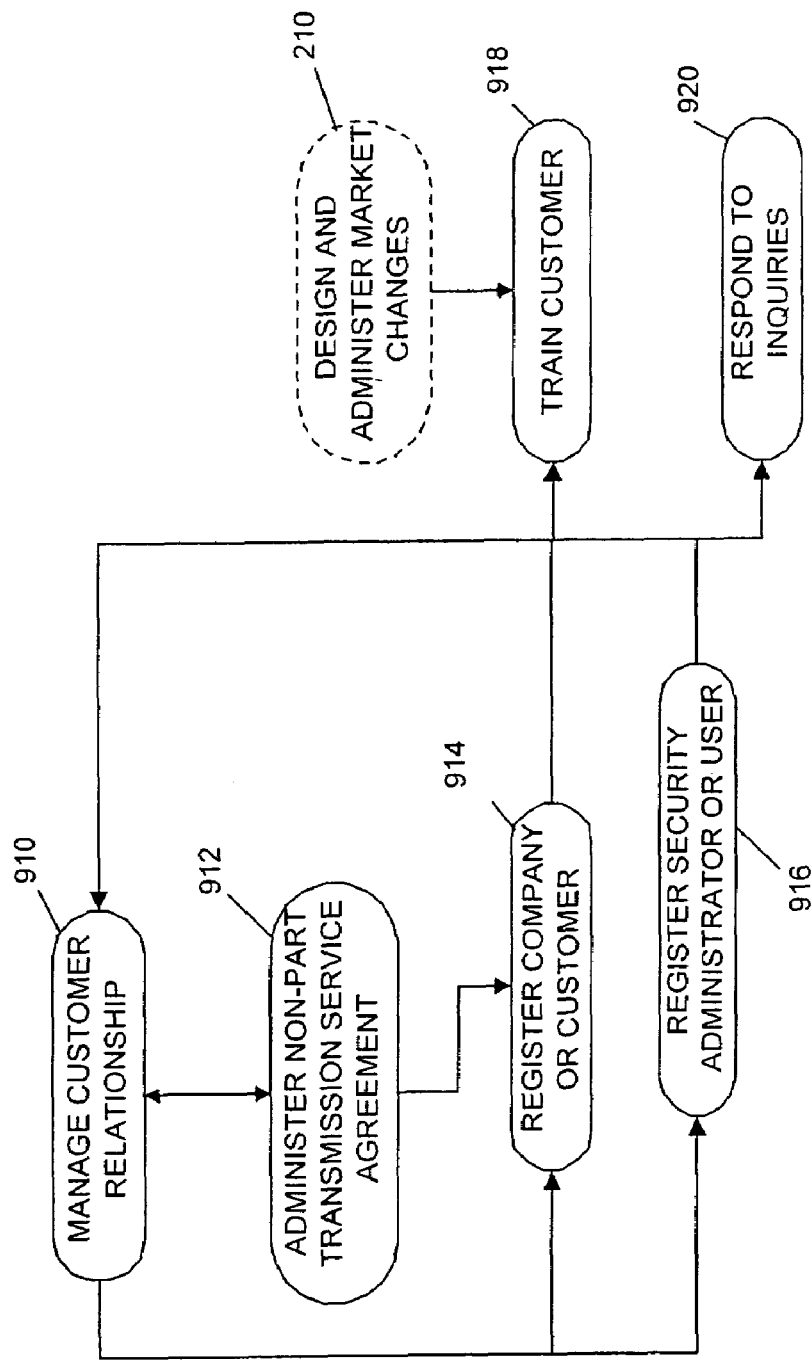
FIG. 13 shows an example embodiment of a serving customers process stream in accordance with the invention.

FIG. 13 shows an example embodiment of a serving customers process stream 900. The serving customers process stream 900 may comprise processes relating to customer service activities. This process stream 900 is focused on maintaining customer satisfaction. As shown in FIG. 13, the processes relating to customer service activities may include at least some of: a manage customer relationship process 910, an administer non-participant (non-part) transmission service agreement process 912, a register company or customer process 914, a register security administrator or user process 916, a train customer process 918, and a respond to inquiries process 920. At least a design and administer market changes process 210 may serve as at least one of an input to or an output from at least one corresponding process of the serving customers process stream 900.

Figure 14:
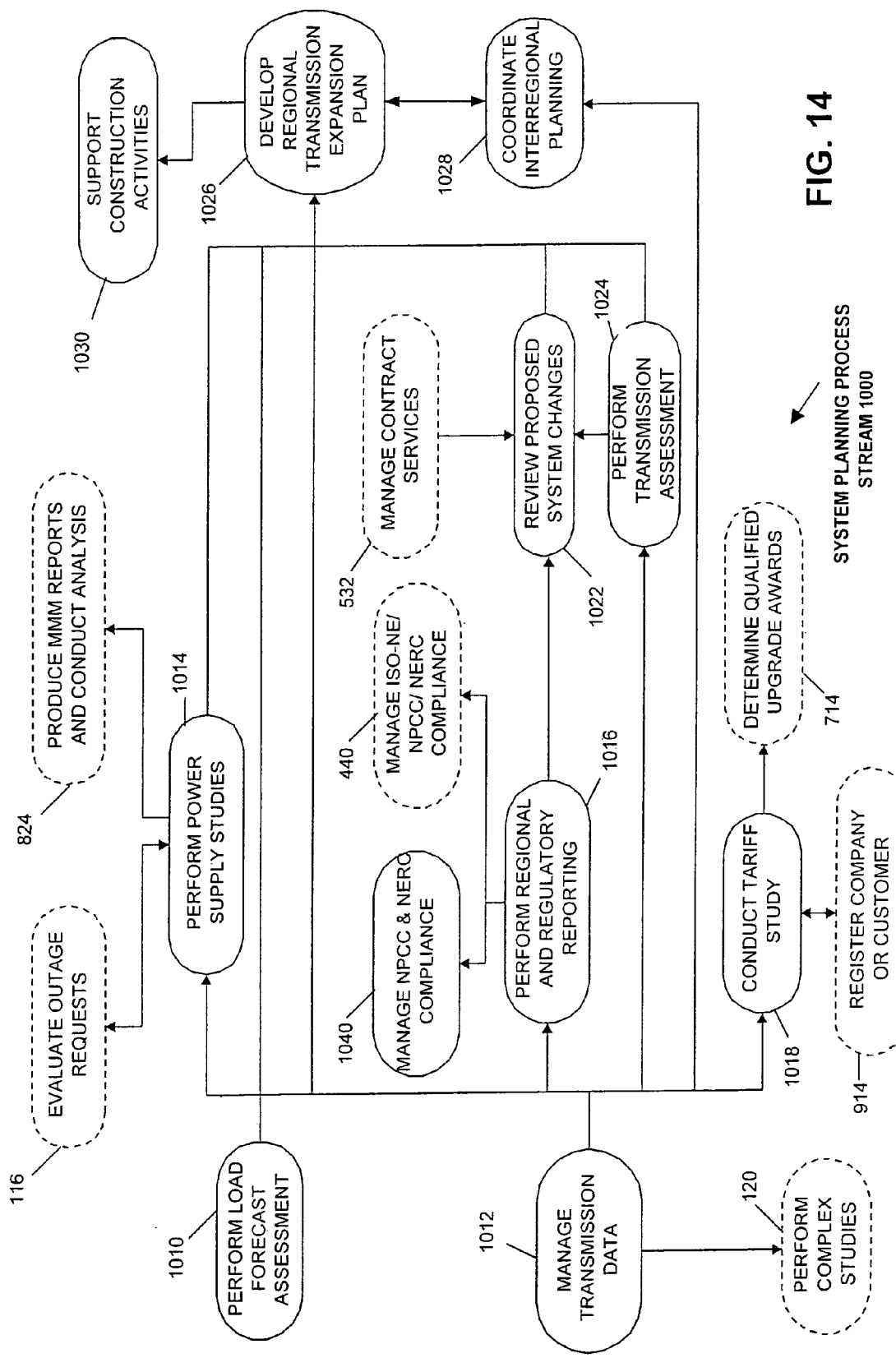
FIG. 14 shows an example embodiment of a system planning process stream in accordance with the invention.

FIG. 14 shows an example embodiment of a system planning process stream 1000. The system planning process stream 1000 may comprise processes relating to automated load forecasting and analysis, power supply and reliability, and transmission planning. The processes of the system planning process stream 1000 usually produce specific outputs, as is suggested by the process names, and can occur at varying times from ad hoc to annual or longer.

As shown in FIG. 14, the processes relating to load forecasting and analysis, power supply and reliability, and transmission planning may include at least some of: a perform load forecast assessment process 1010, a manage transmission data process 1012, a perform power supply studies process 1014, a perform regional and regulatory reporting process 1016, a review proposed system changes process 1022, a perform transmission assessment process 1024, a conduct tariff study process 1018, a develop regional transmission expansion plan process 1026, a coordinate interregional planning process 1028, a support construction activities process 1030, and a manage NPCC and NERC compliance process 1040. At least one of an evaluate outage requests process 116, a produce MMM reports and conduct analysis process 824, a manage ISO/NPCC/NERC compliance process 440, a manage contract services process 532, a perform complex studies process 120, a register company or customer process 914, or a determine qualified upgrade awards process 714 may serve as at least one of an input to or an output from at least one corresponding process of the system planning process stream 1000.

Figure 15:
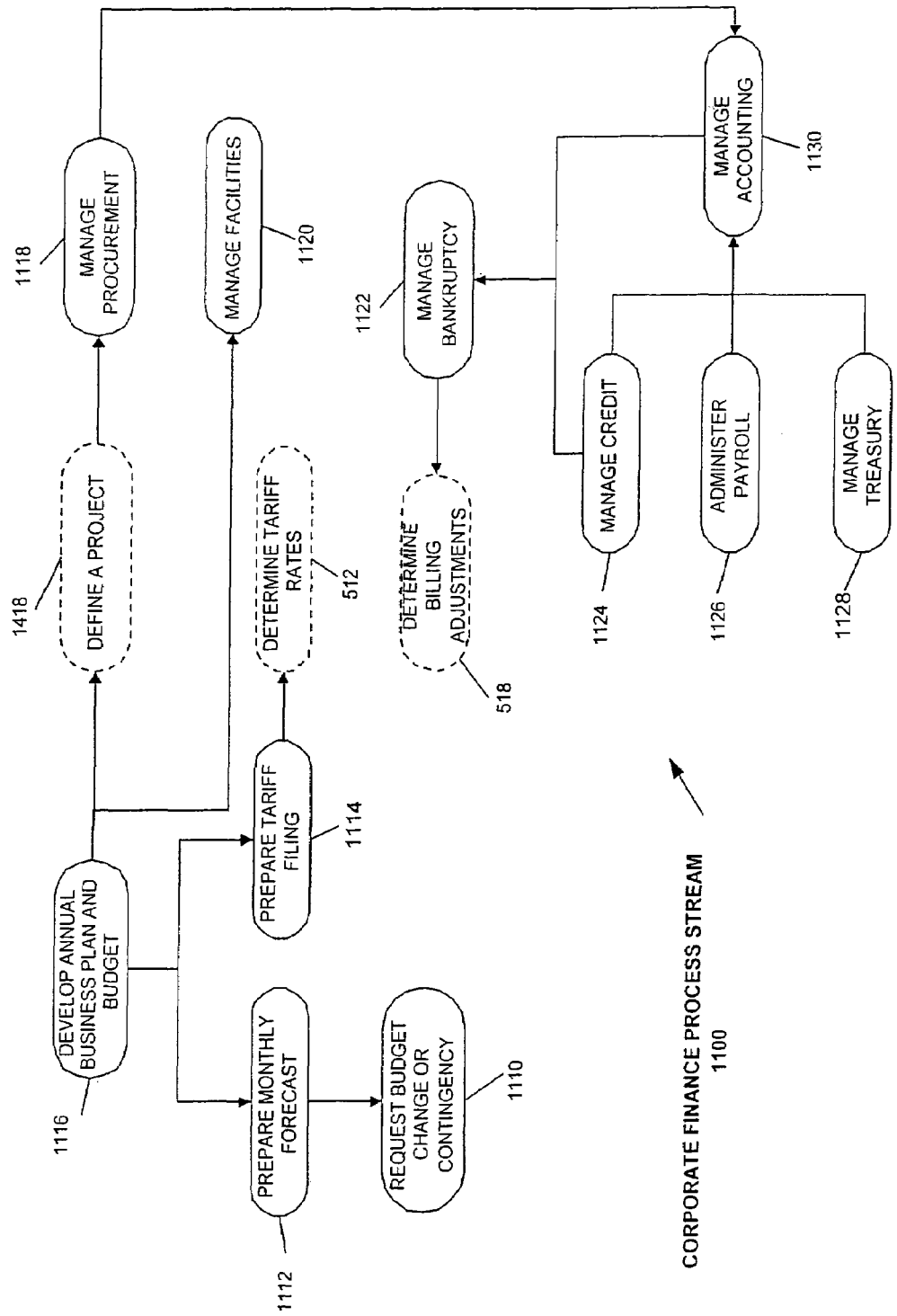
FIG. 15 shows an example embodiment of a corporate finance process stream in accordance with the invention.

FIG. 15 shows an example embodiment of a corporate finance process stream 1100. The corporate finance process stream 1100 may comprise automated processes that address the annual business plan and budget for the ISO, along with other automated accounting functions, including the managing of credit, accounting and treasury, administering of payroll, procurement and facilities.

As shown in FIG. 15, the processes relating to corporate finance, including budgeting and accounting, may include at least some of: a request budget change or contingency process 1110, a prepare monthly forecast process 1112, a prepare tariff filing process 1114, a develop annual business plan and budget process 1116, a manage procurement process 1118, a manage facilities process 1120, a manage bankruptcy process 1122, a manage credit process 1124, an administer payroll process 1126, a manage treasury process 1128, and a manage accounting process 1130. At least one of a define a project process 1418, a determine tariff rates process 512, or a determine billing adjustments process 518 may serve as at least one of an input to or an output from at least one corresponding process of the corporate finance process stream 1100.

Figure 16:
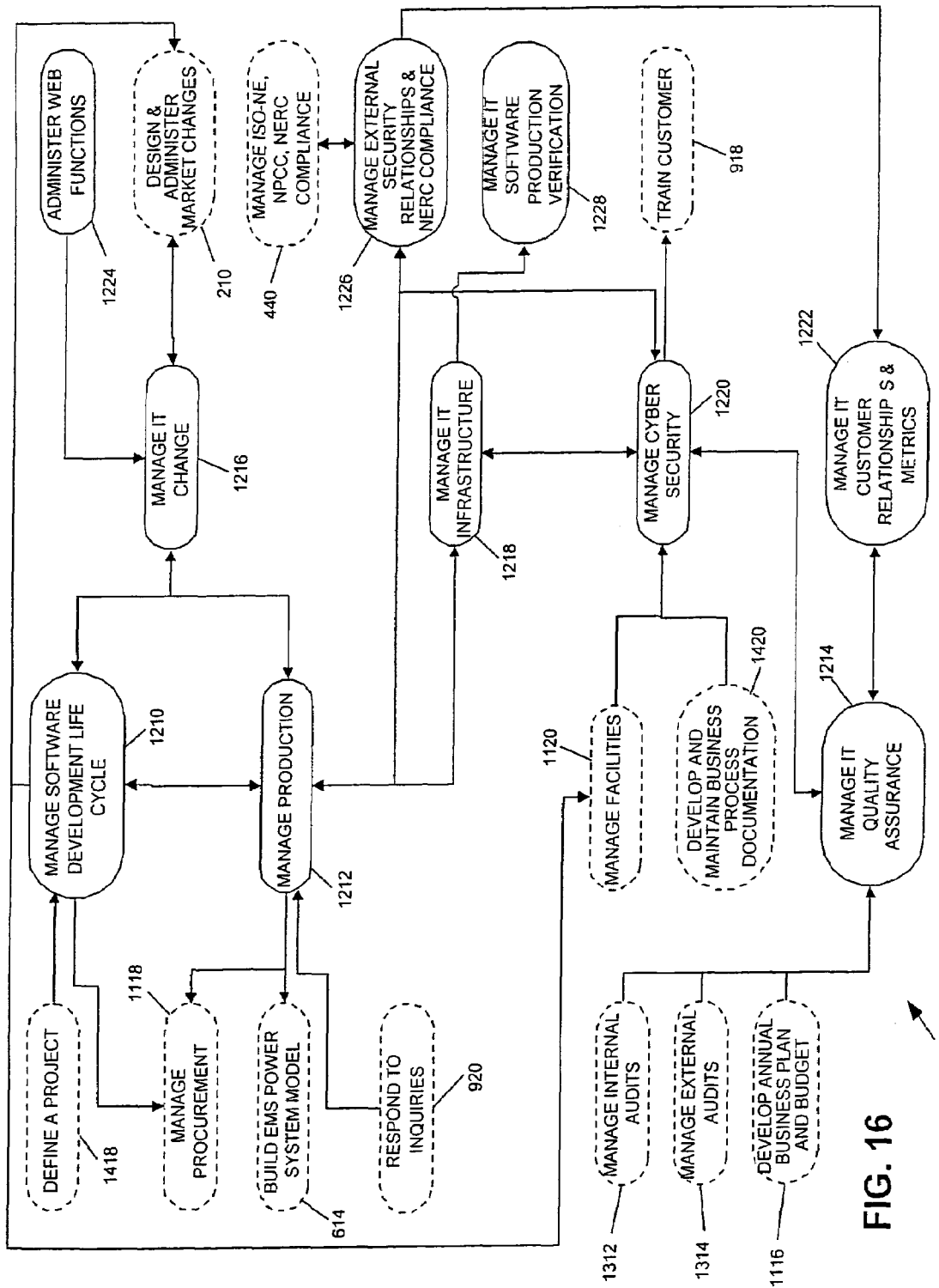
FIG. 16 shows an example embodiment of an information technology process stream in accordance with the invention.

FIG. 16 shows an example embodiment of an information technology process stream 1200. The information technology process stream 1200 may comprise processes related to the support of a complex information technology (IT) environment (e.g., such as the system used by ISO 71 described above in connection with FIG. 2). These activities include management of the software development life cycle, and the on-going management of production and IT change. Processes are also in place to address the management of cyber security and related external security relationships and compliance requirements.

As shown in FIG. 16, the processes relating to support of the ISO's IT environment may include at least some of: a manage software development lifecycle process 1210, a manage production process 1212, a manage IT quality assurance process 1214, a manage IT change process 1216, a manage IT infrastructure process 1218, a manage cyber security process 1220, a manage IT customer relationships and metrics process 1222, an administer web functions process 1224, a manage external security relationships and NERC compliance process 1226, and a manage IT software production verification process 1228. At least one of a define a project process 1418, a manage procurement process 1118, a build EMS power system model process 614, a respond to inquiries process 920, a manage facilities process 1120, a develop and maintain business process documentation process 1420, a manage internal audits process 1312, a manage external audits process 1314, a develop annual business plan and budget process 1116, a design and administer market changes process 210, a manage ISO/NPCC/NERC compliance process 440, and a train customer process 918 may serve as at least one of an input to or an output from at least one corresponding process of the information technology process stream 1200.

Figure 17:
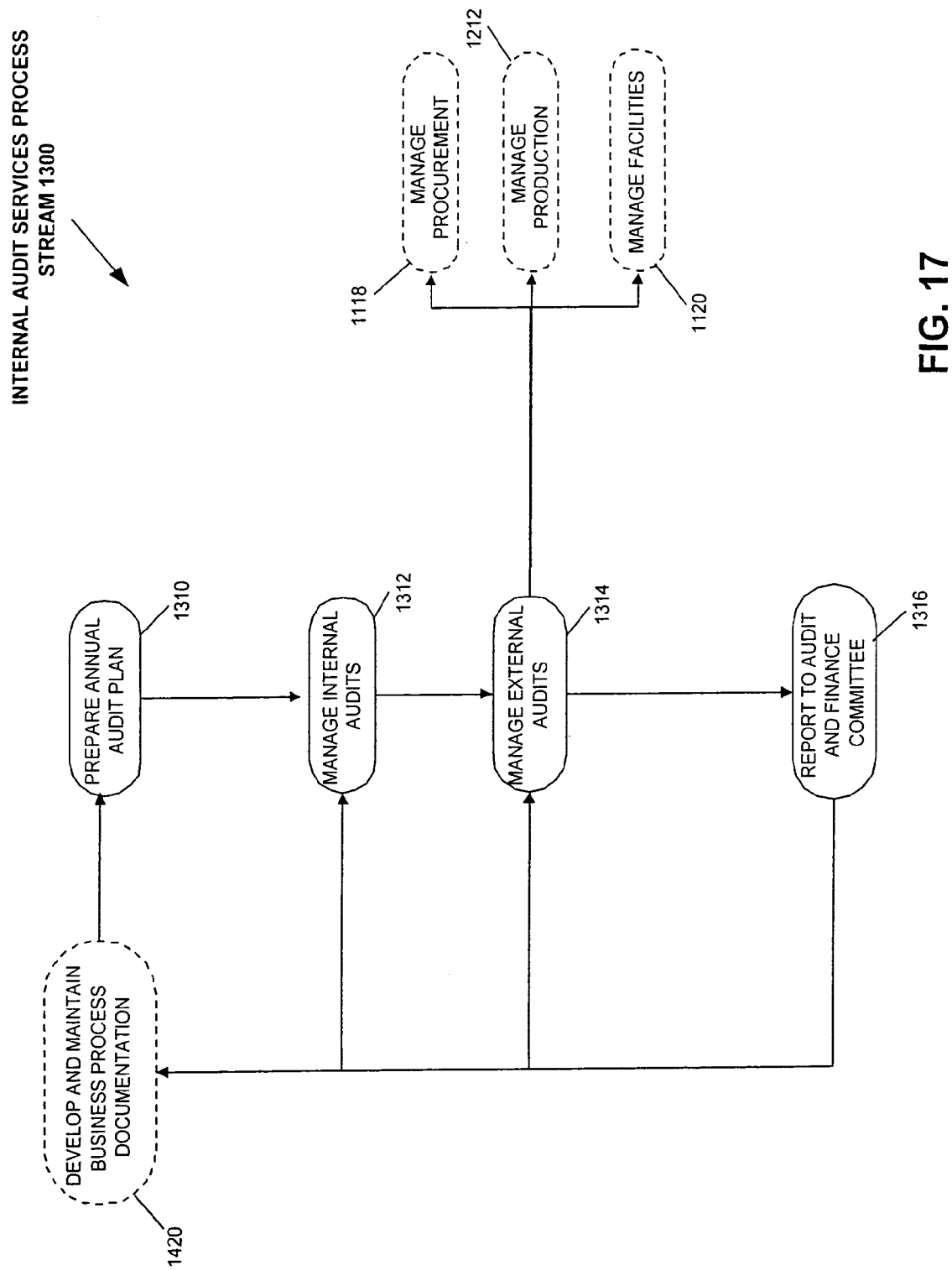
FIG. 17 shows an example embodiment of an internal audit process stream in accordance with the invention.

FIG. 17 shows an example embodiment of an internal audit process stream 1300. The internal audit process stream 1300 may comprise processes for both planning and conducting internal and external audit activities. The annual audit plan establishes the areas for internal or external audit focus. These audit areas may be subject to review and approval of ISO senior management as well as the ISO Board of Directors. Other processes provide for the management of subsequent audit activities, which can be undertaken by internal audit staff or external audit consultants. External audit efforts can include financial audits as well as the Statement of Auditing Standards (SAS) 70 audits.

As shown in FIG. 17, the processes relating to audits may include at least some of: a prepare annual audit plan process 1310, a manage internal audits process 1312, a manage external audits process 1314, and a report to audit and finance committee process 1316. At least one of a develop and maintain business process documentation process 1420, a manage procurement process 1118, a manage production process 1212, or a manage facilities process 1120 may serve as at least one of an input to or an output from at least one corresponding process of the internal audit process stream 1300.

Figure 18:
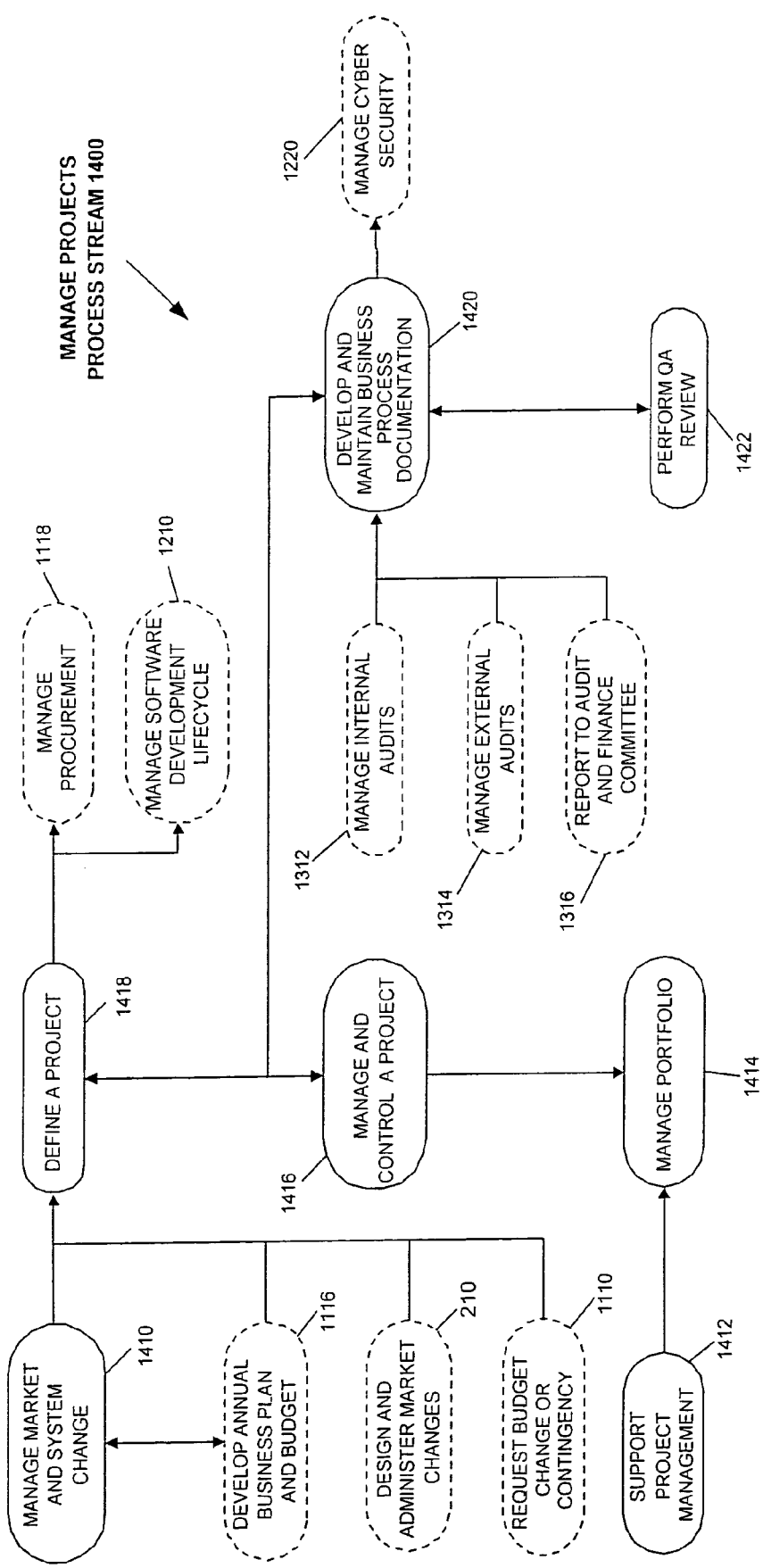
FIG. 18 shows an example embodiment of a manage projects process stream in accordance with the invention.

FIG. 18 shows an example embodiment of a manage projects process stream 1400. The manage projects process stream 1400 may comprise processes that support the design and development of services. These processes deal with the management of market and system change. Automated processes support a project approach to design and development. The processes address new project definition, and the management of that project through a variety of reviews, approvals, implementation and closure. These processes have significant interaction with other processes in the market development and analysis process stream 200.

As shown in FIG. 18, the processes relating to the support and management of projects may include at least some of: a manage market and system change process 1410, a support project management process 1412, a manage portfolio process 1414, a manage and control a project process 1416, a define a project process 1418, a develop and maintain business process documentation process 1420, and a perform quality assurance (QA) review process 1422. At least one of a manage procurement process 1118, a manage software development lifecycle process 1210, a manage internal audits process 1312, a manage external audits process 1314, a report to audit and finance committee process 1316, a develop annual business plan and budget process 1116, a design and administer market changes process 210, a request budget change or contingency process 1110, or a manage cyber security process 1220 may serve as at least one of an input to or an output from at least one corresponding process of the manage projects process stream 1400.

Figure 19:
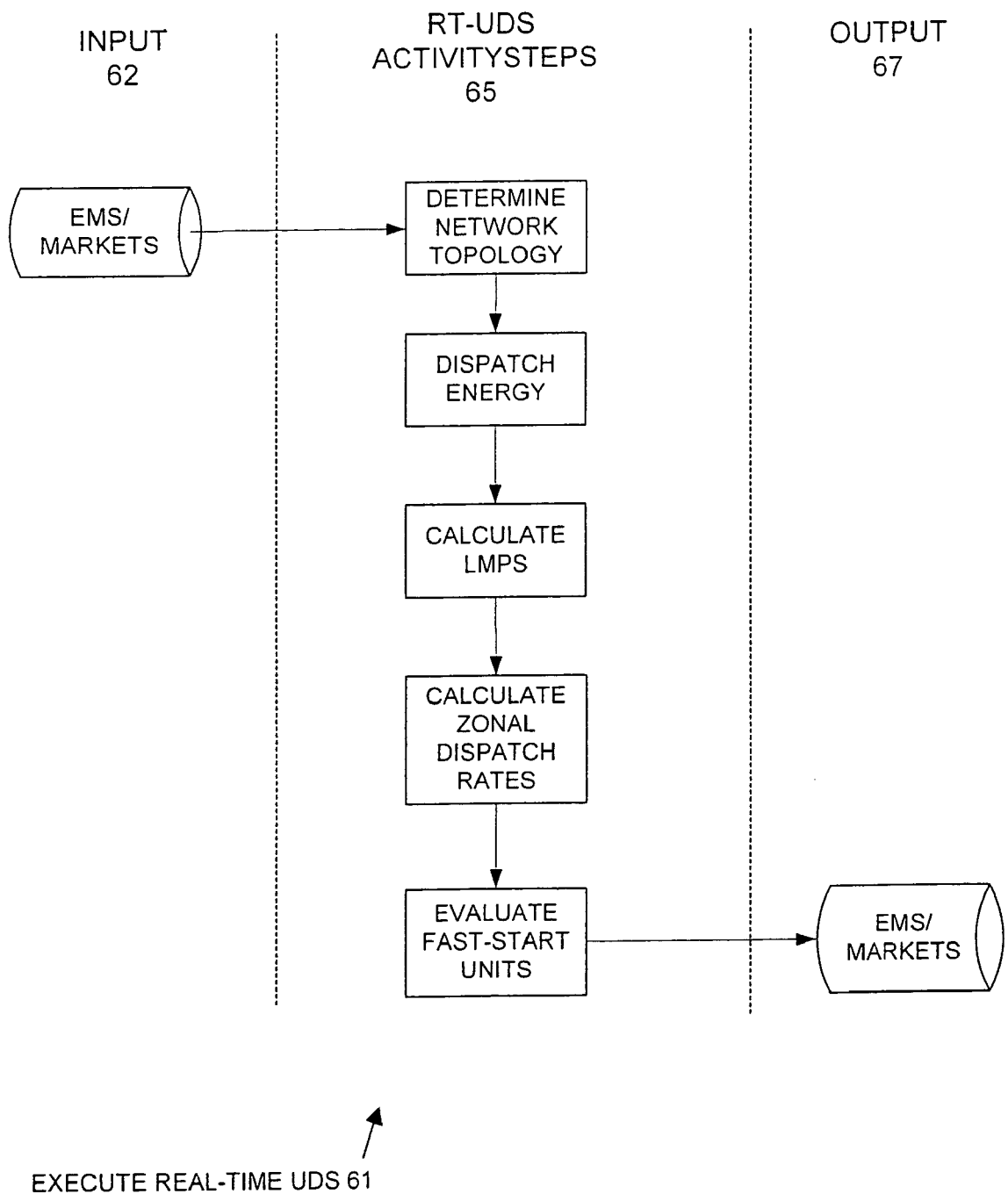
FIG. 19 shows an illustration of an activity flow in accordance with an example embodiment of the invention.

An activity flow 60 (FIG. 3) may optionally be provided for at least one activity in at least one of the plurality of processes in the process streams. The activity may comprise a manual or automated activity. An example of an activity flow 60 is shown in FIG. 19. The activity flow shown in FIG. 19 is for an "execute real-time unit dispatch system" activity (RT-UDS 61 of the dispatch generation resources process 422 shown in automated activity column 33 of FIG. 4).

As shown in FIG. 19, the activity flow 61 may provide at least one of: (i) an illustration of steps of an activity (shown in Real Time-Unit Dispatch System (RT-UDS) activity steps column 65); (ii) a relationship between inputs (column 62) and outputs (column 67) of the activity 61; or (iii) an identification of the function or department performing each task of the activity 61.

It should now be appreciated that the present invention provides advantageous methods and systems for the management of the bulk electric power market and control of an electric power grid.

Although the invention has been described in connection with various example embodiments, numerous modifications and adaptations may be made thereto without departing from the spirit and scope of the invention as set forth in the claims.

What is claimed is:

1. An automated method for the management of a bulk electric power market, comprising:
    implementing a set of inter-related automated process streams relating to the bulk electric power market;
    implementing a plurality of automated processes for each process stream contained in said set of inter-related process streams, at least one process of each process stream serving as an input to, or output from, at least one other process stream, each process having at least one of: (i) automated inputs; (ii) automated activities; (iii) and automated outputs; and
    managing a bulk electric power market and controlling an electric power grid, including at least determining market-based wholesale electric rates from the automated output of at least one of said process streams.

2. An automated method for the management of a bulk electric power market, comprising:
    implementing a set of inter-related automated process streams relating to the bulk electric power market;
    implementing a plurality of automated processes for each process stream contained in said set of inter-related process streams, at least one process of each process stream serving as an input to, or output from, at least one other process stream, each process having at least one of: (i) automated inputs; (ii) automated activities; (iii) and automated outputs; and
    managing a bulk electric power market and controlling an electric power grid, including scheduling transmission outages based on the automated output of at least one of said process streams; creating a day-ahead market schedule from the automated output of at least one of said process streams; and calculating monetary positions of customers involved in settlement of the day-ahead markets from the automated output of at least one of said process streams.

3. A method in accordance with claim 1, wherein said set of automated process streams comprises at least two of: (i) an outage scheduling process stream; (ii) a market development and analysis process stream; (iii) a day-ahead markets process stream; (iv) a real-time markets process stream; (v) a billing services process stream; (vi) a system models process stream; (vii) a Financial Transmission Rights/Auction Revenue Rights (FTR/ARR) auction process stream; (viii) monitor and mitigate markets process streams; (ix) a serving customers process stream; (x) a system planning process stream; (xi) a corporate finance process stream; (xii) an information technology process stream; (xiii) an internal audit process stream; and (xiv) a manage projects process stream.

4. A method in accordance with claim 3, wherein a market development and analysis process stream comprises processes that describe how to undertake changes to a market design.

5. A method in accordance with claim 4, wherein:
    said processes that describe how to undertake changes to a market design include at least one of: a design and administer market changes process, a manage regulatory approval process, a manage demand response program process, a manage capacity shortfall (GAP) Request for Proposal (RFP) process, a certify new Internet Based Communication System (JBCS) provider process, an approve profiled metering and verification plan process, a verify metering and event data process, and a register IBCS Open Source (OS) user process; and
    at least one of a register new company or customer process, a register or maintain interruptible load asset process, a manage production process, a determine billing adjustments process, a define a project process, and a manage software development lifecycle process serves as at least one of an input to or an output from at least one corresponding process of the market development and analysis process stream.

6. A method in accordance with claim 3, wherein a system models process stream comprises processes that build and maintain various power system models that form a foundation for other process streams.

7. A method in accordance with claim 6, wherein:
    said processes that build and maintain the various power system models include at least one of: a register or maintain generation or dispatchable load asset process, a register e-dispatch capability process, a build Energy Management System (EMS) power system model process, a build Unit Dispatch System (UDS) network database process, an install EMS power system model process, a maintain technical asset information process, a deactivate pricing nodes process, an activate generation asset process, an activate transmission asset process, a register or maintain settlements only generation asset process, a register or maintain load asset process, a register or maintain tie line asset process, a register or maintain interruptible load asset process, a register or de-register intermittent power resource process, a de-list and re-list Installed Capacity (ICAP) power resources process, and a maintain settlements market system process; and
    at least one of a build Financial Transmission Rights (FTR) model process, a settle the day-ahead markets process, and a settle the real-time markets process serves as at least one of an input to or an output from at least one corresponding process of the system models process stream.

8. A method in accordance with claim 3, wherein an outage scheduling process stream comprises processes that capture and maintain generation and transmission outage information.

9. A method in accordance with claim 8, wherein:
    said processes that capture and maintain generation and transmission outage information include at least one of: a capture generation outage requests process, a capture transmission outage requests process, a maintain outage scheduler process, an evaluate outage requests process, a develop constraints process, and a perform complex studies process; and
    at least one of a perform power supply studies process, a manage transmission data process, and a maintain system security process serves as at least one of an input to or an output from at least one corresponding process of the outage scheduling process stream.

10. A method in accordance with claim 3, wherein a FTR/ARR auction process stream comprises processes that govern the FTR auction and allocation of the auction revenues.

11. A method in accordance with claim 10, wherein:
said processes that accomplish the FTR auction and allocation of the auction revenues include at least one of: a build FTR model process, a capture FTR bid data process, a determine qualified upgrade awards process, an operate FTR auction process, an operate secondary FTR market process, and an allocate auction revenue process; and
at least one of an install Energy Management System (EMS) power system model process, a register security administrator process, an evaluate outage requests process, a conduct tariff study process, a settle the day-ahead markets process, and a bill the customer process serves as at least one of an input to or an output from at least one corresponding process of the FTR/ARR auction process stream.

12. A method in accordance with claim 3, wherein a day-ahead markets process stream comprises daily processes that lead to the settlement of the day-ahead markets.

13. A method in accordance with claim 12, wherein:
said processes that lead to the settlement of the day-ahead markets include at least one of: a capture day-ahead bids and offers process, an extend day-ahead trading deadline process, a capture day-ahead external transactions process, a monitor and alter participant day-ahead bids process, a create day-ahead market schedules process, a settle the day-ahead markets process, a capture day-ahead internal bilateral transactions process, a recreate day-ahead schedules process, and a re-populate day-ahead data process; and
at least one of an evaluate offers and bids process, a develop constraints process, a perform reserve adequacy commitment process, a bill the customer process, a monitor unit characteristics process, a produce Monitor and Mitigate Markets (MMM) reports and conduct analysis process, and a produce periodic market reports process serves as at least one of an input to or an output from at least one corresponding process of the day-ahead markets process stream.

14. A method in accordance with claim 3, wherein a real-time markets process stream comprises daily and minute-to-minute processes that lead to settling of real-time markets.

15. A method in accordance with claim 14, wherein:
said daily and minute-to-minute processes that lead to settling of real-time markets include at least one of: a capture real-time external transactions process, an evaluate real-time external transactions process, a perform day-before check out of real-time external transactions process, a capture real-time bids and offers process, a perform reserve adequacy commitment process, a maintain system security process, a dispatch generation resources process, a dispatch regulation process, a schedule next-hour real-time external transactions process, a curtail real-time external transactions process, a maintain real-time operational data process, an implement emergency operations process, a perform operations administrative tasks process, a capture telemeter data process, a manage Independent System Operator (ISO)/Northeast Power Coordinating Council (NPCC)/North American Electric Reliability Council (NERC) compliance process, a monitor resource performance process, a perform operations daily review process, a settle the real-time markets process, a capture real-time internal bilateral transactions process, a produce periodic market reports process, and a capture meter data process; and at least one of a mitigate offers and bids process, a create day-ahead market schedules process, a develop constraints process, a manage facilities process, a register security administrator process, a manage NPCC and NERC compliance process, a perform regional and regulatory reporting process, a determine billing adjustments process, and a produce MMM reports and conduct analysis process serves as at least one of an input to or an output from at least one corresponding process of the real-time markets process stream.

16. A method in accordance with claim 3, wherein a billing services process stream comprises processes occurring on a monthly basis to prepare and issue bills to customers.

17. A method in accordance with claim 16, wherein:
said processes occurring on a monthly basis to prepare and issue bills to customers include at least one of: a capture tariff-related owner data process, a determine tariff rates process, a determine Installed Capacity (ICAP) settlement process, a determine monthly Financial Transmission Rights (FTR) settlement process, a determine billing adjustment process, a determine transmission service settlement process, a determine Independent System Operator (ISO) tariff settlement process, a bill the customer process, an update "understanding your bill" job aid process, a transfer funds process, a manage billing disputes process, a manage contract services process, an administer forward reserve auction process, a determine demand response settlement process, a determine Reliability Must Run (RMR) settlement process, and a settle forward reserve market process; and
at least one of a settle the day-ahead markets process, a settle the real-time markets process, an allocate auction revenue process, a prepare tariff filing process, a capture generation outage requests process, a perform power supply studies process, and a review proposed system changes process serves as at least one of an input to or an output from at least one corresponding process of the billing services process stream.

18. A method in accordance with claim 3, wherein a daily monitor and mitigate markets process stream comprises daily processes that monitor market activity and mitigate market effects that would distort competitive outcomes.

19. A method in accordance with claim 18, wherein:
said daily processes that monitor market activity and mitigate market effects that would distort competitive outcomes include at least one of: a capture authorities and contact information process, a develop evaluation parameters process, an evaluate offers and bids process, a mitigate offers and bids process, a monitor unit characteristics process, an assess participant feedback process, a provide participant reference levels process, a produce Monitor and Mitigate Markets (MMM) reports and conduct analysis process, and an assess participant sanctions process; and
at least one of a capture day-ahead bids and offers process, a create day-ahead market schedules process, a develop constraints process, a capture real-time bids and offers process, a perform reserve adequacy commitment process, a maintain real-time operational data process, a settle the day-ahead markets process, a settle the real-time markets process, a register company or customer process, and a register or maintain generation or dispatchable load asset process serves as at least one of an input to or an output from at least one corresponding process of the daily monitor and mitigate markets process stream.

20. A method in accordance with claim 3, wherein a monthly monitor and mitigate markets process stream comprises monthly processes relating to assessing FTR caps and operating reserve.

21. A method in accordance with claim 20, wherein: said processes relating to assessing FTR caps and operating reserve include at least one of: a capture authorities and contact information process, a develop evaluation parameters process, an assess participant feedback process, assess operating reserve impact process, and an assess FTR caps process; and
at least one of a settle the day-ahead markets process, a settle the real time markets process, an operate FTR auction process, a create day-ahead market schedules process, and a determine billing adjustment process serves as at least one of an input to or an output from at least one corresponding process of the monthly monitor and mitigate markets process stream.

22. A method in accordance with claim 3, wherein a bi-yearly monitor and mitigate markets process stream comprises processes relating to monitoring the forward reserve auction.

23. A method in accordance with claim 22, wherein:
said processes relating to monitoring the forward reserve auction include at least one of: a capture authorities and contact information process, and a monitor forward reserve auction process; and
at least one of an administer the forward reserve auction process, a capture day-ahead offers process, and a register or maintain generation or dispatchable load asset serves as at least one of an input to or an output from at least one corresponding process of the bi-yearly monitor and mitigate markets process stream.

24. A method in accordance with claim 3, wherein a periodic monitor and mitigate markets process stream comprises processes relating to periodic and ad hoc market analysis and reporting.

25. A method in accordance with claim 24, wherein:
said processes relating to periodic and ad hoc market analysis and reporting include at least: a produce Monitor and Mitigate Markets (MMM) reports and conduct analysis process; and
at least one of a settle the day-ahead market process, a settle the real-time markets process, a produce periodic market reports process, and a manage regulatory approval process serves as at least one of an input to or an output from at least one corresponding process of the periodic monitor and mitigate markets process stream.

26. A method in accordance with claim 3, wherein a system planning process stream comprises processes relating to load forecasting and analysis, power supply and reliability, and transmission planning.

27. A method in accordance with claim 26, wherein:
said processes relating to load forecasting and analysis, power supply and reliability, and transmission planning include at least one of: a perform load forecast assessment process, a manage transmission data process, a perform power supply studies process, a perform regional and regulatory reporting process, a review proposed system changes process, a perform transmission assessment process, a conduct tariff study process, a develop regional transmission expansion plan process, a coordinate interregional planning process, a support construction activities process, and a manage Northeast Power Coordinating Council (NPCC) and North American Electric Reliability Council (NERC) compliance process; and
at least one of an evaluate outage requests process, a produce Monitor and Mitigate Markets (MMM) reports and conduct analysis process, a manage Independent System Operator (ISO)/Northeast Power Coordinating Council (NPCC)/North American Electric Reliability Council (NERC) compliance process, a manage contract services process, a perform complex studies process, a register company or customer process, and a determine qualified upgrade awards process serves as at least one of an input to or an output from at least one corresponding process of the system planning process stream.

28. A method in accordance with claim 3, wherein a serving customers process stream comprises processes relating to customer service activities.

29. A method in accordance with claim 28, wherein:
said processes relating to customer service activities include at least one of: a manage customer relationship process, an administer non-participant (non-part) transmission service agreement process, a register company or customer process, a register security administrator or user process, a train customer process, and a respond to inquiries process; and
at least a design and administer market changes process serves as at least one of an input to or an output from at least one corresponding process of the serving customers process stream.

30. A method in accordance with claim 3, wherein a corporate finance process stream comprises processes relating to the annual business plan and budget for an Independent System Operator (ISO).

31. A method in accordance with claim 30, wherein:
said processes relating to the annual business plan and budget for an ISO include at least one of: a request budget change or contingency process, a prepare monthly forecast process, a prepare tariff filing process, a develop annual business plan and budget process, a manage procurement process, a manage facilities process, a manage bankruptcy process, a manage credit process, an administer payroll process, a manage treasury process, and a manage accounting process; and
at least one of a define a project process, a determine tariff rates process, and a determine billing adjustments process serves as at least one of an input to or an output from at least one corresponding process of the corporate finance process stream.

32. A method in accordance with claim 3, wherein an information technology process stream comprises processes relating to the support of a complex information technology (IT) environment.

33. A method in accordance with claim 32, wherein:
said processes relating to the support of a complex IT environment include at least one of: a manage software development lifecycle process, a manage production process, a manage IT quality assurance process, a manage IT change process, a manage IT infrastructure process, a manage cyber security process, a manage IT customer relationships and metrics process, an administer web functions process, a manage external security relationships and North American Electric Reliability Council (NERC) compliance process, and a manage IT software production verification process; and at least one of a define a project process, a manage procurement process, a build EMS power system model process, a respond to inquiries process, a manage facilities process 1120, a develop and maintain business process documentation process, a manage internal audits process, a manage external audits process, a develop annual business plan and budget process, a design and administer market changes process, a manage Independent System Operator (ISO)/Northeast Power Coordinating Council (NPCC)/North American Electric Reliability Council (NERC) compliance process, and a train customer process serves as at least one of an input to or an output from at least one corresponding process of the information technology process stream.

34. A method in accordance with claim 3, wherein an internal audit process stream comprises processes relating to planning and conducting internal and external audit activities.

35. A method in accordance with claim 34, wherein:
   said processes relating to planning and conducting internal and external audit activities include at least one of: a prepare annual audit plan process, a manage internal audits process, a manage external audits process, and a report to audit and finance committee process; and
   at least one of a develop and maintain business process documentation process, a manage procurement process, a manage production process, and a manage facilities process serve as at least one of an input to or an output from at least one corresponding process of the internal audit process stream.

36. A method in accordance with claim 3, wherein a manage projects process stream comprises processes that support the design and development of services.

37. A method in accordance with claim 36, wherein:
   said processes that support the design and development of services include at least one of: a manage market and system change process, a support project management process, a manage portfolio process, a manage and control a project process, a define a project process, a develop and maintain business process documentation process, and a perform quality assurance (QA) review process; and
   at least one of a manage procurement process, a manage software development lifecycle process, a manage internal audits process, a manage external audits process, a report to audit and finance committee process, a develop annual business plan and budget process, a design and administer market changes process, a request budget change or contingency process, and a manage cyber security process serves as at least one of an input to or an output from at least one corresponding process of the manage projects process stream.

38. A system for the management of a bulk electric power market, comprising:
   memory for storing: (a) a set of inter-related automated process streams relating to the bulk electric power market; and (b) a plurality of automated processes for each process stream contained in said set of inter-related process streams, at least one process of each process stream serving as an input to, or output from, at least one other process stream, each process having at least one of: (i) automated inputs; (ii) automated activities; (iii) and automated outputs;
   a database for storing data for use in implementing the processes of said process streams; and
   at least one processor for executing the processes of each of said inter-related process streams;
   wherein:
   said process streams are used to manage a bulk electric power market and control an electric power grid, including at least determining market-based wholesale electric rates from the automated output of at least one of said process streams.

39. A system in accordance with claim 38, wherein said process streams further enable at least one of: scheduling transmission outages based on the automated output of at least one of said process streams; creating a day-ahead market schedule from the automated output of at least one of said process streams; and calculating monetary positions of customers involved in settlement of the day-ahead markets from the automated output of at least one of said process streams.

40. A system in accordance with claim 38, further comprising:
   a network for communication with a plurality of electrical utilities capable of supplying said electric power grid, wherein said database stores information obtained from said utilities for use in executing said processes.

* * * * *

UNITED STATES PATENT AND TRADEMARK OFFICE
CERTIFICATE OF CORRECTION

| | | |
|---|---|---|
| PATENT NO. | : 7,305,281 B2 | Page 1 of 1 |
| APPLICATION NO. | : 11/123541 | |
| DATED | : December 4, 2007 | |
| INVENTOR(S) | : Scott et al. | |

It is certified that error appears in the above-identified patent and that said Letters Patent is hereby corrected as shown below:

Column 16, line 4: "(JBCS)" should read -- (IBCS) --.

Signed and Sealed this

Twenty-ninth Day of April, 2008

JON W. DUDAS
*Director of the United States Patent and Trademark Office*